(12) United States Patent
Huang et al.

(10) Patent No.: US 10,239,415 B2
(45) Date of Patent: Mar. 26, 2019

(54) BASE SIDE VEHICLE IDENTIFICATION USING VEHICLE CONTROLLER SWITCHING FREQUENCY

(71) Applicant: QUALCOMM Incorporated, San Diego, CA (US)

(72) Inventors: Chang-Yu Huang, Auckland (NZ); Michael Neath, Auckland (NZ); Michael Le Gallais Kissin, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 15/491,016

(22) Filed: Apr. 19, 2017

(65) Prior Publication Data

US 2017/0368944 A1 Dec. 28, 2017

Related U.S. Application Data

(60) Provisional application No. 62/354,344, filed on Jun. 24, 2016.

(51) Int. Cl.
*H02J 7/00* (2006.01)
*B60L 11/18* (2006.01)
(Continued)

(52) U.S. Cl.
CPC ......... *B60L 11/182* (2013.01); *B60L 11/1829* (2013.01); *B60L 11/1831* (2013.01); *B60L 11/1833* (2013.01); *B60L 11/1846* (2013.01); *H02J 7/025* (2013.01); *H02J 50/12* (2016.02); *B60L 2230/10* (2013.01); *B60L 2270/147* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
USPC ....................................................... 320/108
See application file for complete search history.

(56) References Cited

U.S. PATENT DOCUMENTS

| | | |
|---|---|---|
| 5,573,090 A | 11/1996 | Ross |
| 2011/0254377 A1 | 10/2011 | Widmer et al. |

(Continued)

FOREIGN PATENT DOCUMENTS

| | | |
|---|---|---|
| WO | 2012116054 A2 | 8/2012 |
| WO | 2014130046 A1 | 8/2014 |

OTHER PUBLICATIONS

International Search Report and Written Opinion—PCT/US2017/034962—ISA/EPO—dated Aug. 21, 2017.

*Primary Examiner* — Samuel Berhanu
(74) *Attorney, Agent, or Firm* — Hunter Clark PLLC

(57) ABSTRACT

Techniques for wirelessly transferring energy to a vehicle are disclosed. An example method for wirelessly transferring energy to a vehicle according to the disclosure includes detecting a ripple frequency on a transmitter coil circuit, such that the ripple frequency is associated with a vehicle switch mode controller frequency of a switch mode controller in the vehicle, and providing an electrical current to a coil in the transmitter coil circuit based at least in part on the ripple frequency.

30 Claims, 16 Drawing Sheets

(51) Int. Cl.
*H02J 50/12* (2016.01)
*H02J 7/02* (2016.01)

(56) References Cited

U.S. PATENT DOCUMENTS

| | | |
|---|---|---|
| 2012/0217111 A1 | 8/2012 | Boys et al. |
| 2013/0154553 A1* | 6/2013 | Steele .................. B60L 11/182 320/108 |
| 2013/0249479 A1 | 9/2013 | Partovi |
| 2014/0125286 A1 | 5/2014 | Cho et al. |
| 2014/0145516 A1 | 5/2014 | Hirosawa et al. |
| 2015/0298559 A1 | 10/2015 | Keeling et al. |

* cited by examiner

BASE SIDE VEHICLE IDENTIFICATION USING VEHICLE CONTROLLER SWITCHING FREQUENCY

CROSS-REFERENCE TO RELATED APPLICATIONS

This application claims the benefit of U.S. Provisional Application No. 62/354,344 filed Jun. 24, 2016, entitled "BASE SIDE VEHICLE IDENTIFICATION USING VEHICLE CONTROLLER SWITCHING FREQUENCY," the entire contents of which is hereby incorporated herein by reference.

FIELD

This application is generally related to wireless power charging of chargeable devices such as electric vehicles, and more specifically to systems and methods for base side vehicle pad identification using vehicle controller switching frequency.

BACKGROUND

Chargeable systems, such as vehicles, have been introduced that include locomotion power derived from electricity received from an energy storage device such as a battery. Vehicles that are solely electric generally receive the electricity for charging the batteries from other sources. Battery electric vehicles are often proposed to be charged through some type of wireless charging system that is capable of transferring power in free space (e.g., via a wireless field). Some such systems may provide wireless power to multiple vehicles while the vehicles are located on the roadway, in motion or stationary. In some multiple vehicle charging solutions, one central base charging control unit is utilized. In such a system, it may be difficult for the central system controller to identify the vehicle with an associated active base pad.

SUMMARY

An example method for wirelessly transferring energy to a vehicle according to the disclosure includes detecting a ripple frequency on a transmitter coil circuit, such that the ripple frequency is associated with a vehicle switch mode controller frequency of a switch mode controller in the vehicle, and providing an electrical current to a coil in the transmitter coil circuit based at least in part on the ripple frequency.

Implementations of such a method may include one or more of the following features. The coil in the transmitter coil circuit may be configured to generate a magnetic field to transfer energy to the vehicle via induction. Wirelessly transferring power to the vehicle may be performed at a system charging frequency and the ripple frequency may correspond to a beat frequency between the vehicle switch mode controller frequency and the system charging frequency. The vehicle switch mode controller frequency may be determined based on the ripple frequency and the system charging frequency. A vehicle identification may be determined based on the vehicle switch mode controller frequency. The ripple frequency may be provided to a distribution controller, and a command may be received from the distribution controller, such that providing the electrical current to the coil in the transmitter coil circuit may be based on the command. The vehicle switch mode controller frequency may be provided to a second transmitter coil circuit, such that the second transmitter coil circuit may be configured to provided current to a second coil based on the vehicle switch mode controller frequency. A vehicle controller switching duty cycle may be determined based on the ripple frequency. The ripple frequency may be associated with a ripple envelope and providing the electrical current to the coil in the transmitter coil circuit is based on a magnitude of the ripple envelope.

An example of an apparatus for wirelessly transferring energy to a vehicle according to the disclosure includes a transmitter coil circuit including a coil, a ripple detector operably coupled to the transmitter coil circuit, at least one processor operably coupled to the transmitter coil circuit and the ripple detector and configured to receive a ripple frequency from the ripple detector, such that the ripple frequency is associated with a vehicle switch mode controller frequency of a switch mode controller in the vehicle, and provide an electrical current to the transmitter coil circuit based at least in part on the ripple frequency.

Implementations of such an apparatus may include one or more of the following features. The coil may be configured to generate a magnetic field to transfer energy to the vehicle via induction. The ripple detector may include a peak detector stage comprising at least a series connection of a diode and a capacitor. The ripple detector may include a sample and hold stage comprising at least a capacitor, a field effect transistor (FET), and an operational amplifier. The ripple detector may include a zero crossing detector stage comprising at least an operational amplifier comparator circuit. The transmitter coil circuit may be configured to operate at a system charging frequency and the ripple frequency may be equal to a beat frequency between the vehicle switch mode controller frequency and the system charging frequency. The at least one processor may be configured to determine the vehicle switch mode controller frequency based on the ripple frequency and the system charging frequency. The at least one processor may be configured to determine a vehicle identification based on the vehicle switch mode controller frequency. The at least one processor may be configured to provide the ripple frequency to a distribution controller, receive a command from the distribution controller, and provide the electrical current to the transmitter coil circuit based at least in part on the command. The at least one processor may be configured to determine a vehicle controller switching duty cycle based on the ripple frequency.

An example of an apparatus for wirelessly transferring energy to a vehicle according to the disclosure includes means for detecting a ripple frequency on a transmitter means, such that the ripple frequency is associated with a vehicle switch mode controller frequency of a switch mode controller in the vehicle, and means for providing an electrical current to the transmitter means based at least in part on the ripple frequency.

An example of a non-transitory processor-readable storage medium comprising processor-readable instructions configured to cause one or more processors to control a wireless charging system according to the disclosure includes code for detecting a ripple frequency on a transmitter coil circuit, such that the ripple frequency is associated with a vehicle switch mode controller frequency of a switch mode controller in a vehicle, and code for providing an electrical current to a coil in the transmitter coil circuit based at least in part on the ripple frequency.

An example of a method for wirelessly transferring energy to a vehicle according to the disclosure includes transferring energy between a base pad and the vehicle, such that the base pad includes a base pad coil circuit and the vehicle includes a vehicle controller, determining a magnitude of a ripple envelope on the base pad coil circuit, such that the ripple envelope is associated with a vehicle controller switching frequency, and adjusting the transfer of energy between the base pad and the vehicle until the magnitude of the ripple envelope is a nominal value.

An example of a method for setting an operational frequency of a vehicle switch mode controller in an electric vehicle according to the disclosure includes sending a current switch mode controller frequency value to a charging area control station, receiving a requested switch mode controller frequency value from the charging area control station, and setting the operational frequency of the vehicle switch mode controller to the requested switch mode controller frequency value.

Implementations of such a method may include one or more of the following features. The operational frequency of the vehicle switch mode controller may be a value between 70 kHz and 90 kHz. A wireless energy transfer may be received from a base pad based on the requested switch mode controller frequency value. The electric vehicle may include a front vehicle switch mode controller and a rear vehicle switch mode controller and sending the current switch mode controller frequency value may include sending a current front switch mode controller frequency value and a rear switch mode controller frequency value to the charging area control station. A requested front switch mode controller frequency value and a requested rear switch mode controller frequency value may be received from the charging area control station, the operational frequency of the front vehicle switch mode controller may be set to the requested front switch mode controller frequency value, and the operational frequency of the rear vehicle switch mode controller may be set to the requested rear switch mode controller frequency value, such that the requested front switch mode controller frequency value and the requested rear switch mode controller frequency value are not equal. A frequency difference between the requested front switch mode controller frequency value and the requested rear switch mode controller frequency value may be greater than 0.5 kHz.

An apparatus for wirelessly transferring energy to a vehicle according to the disclosure includes a base pad coil circuit configured to transfer energy between a base pad coil and the vehicle, such that the vehicle includes a vehicle controller, a ripple detector operably coupled to the base pad coil circuit, at least one processor operably coupled to the base pad coil circuit ripple detector and configured to receive a ripple envelop from the ripple detector, determine a magnitude of the ripple envelope, such that the ripple envelope is associated with a vehicle controller switching frequency, and adjust the transfer of energy between the base pad and the vehicle until the magnitude of the ripple envelope is a nominal value.

An apparatus for setting an operational frequency of a vehicle switch mode controller in an electric vehicle according to the disclosure includes a memory, a communications module, at least one processor operable coupled to the memory, communications module and the vehicle switch mode controller, the at least one processor configured to send a current switch mode controller frequency value to a charging area control station, receive a requested switch mode controller frequency value from the charging area control station, and set the operational frequency of the vehicle switch mode controller to the requested switch mode controller frequency value.

Implementations of such an apparatus may include one or more of the following features. The operational frequency of the vehicle switch mode controller may be set to a value between 70 kHz and 90 kHz. The at least one processor may be operably coupled to a front vehicle switch mode controller and a rear vehicle switch mode controller and may be configured to send a current front switch mode controller frequency value and a rear switch mode controller frequency value to the charging area control station. The at least one processor may be configured to receive a requested front switch mode controller frequency value and a requested rear switch mode controller frequency value from the charging area control station, set the operational frequency of the front vehicle switch mode controller to the requested front switch mode controller frequency value, and set the operational frequency of the rear vehicle switch mode controller to the requested rear switch mode controller frequency value, such that the requested front switch mode controller frequency value and the requested rear switch mode controller frequency value are not equal. A frequency difference between the requested front switch mode controller frequency value and the requested rear switch mode controller frequency value may be greater than 0.5 kHz.

Items and/or techniques described herein may provide one or more of the following capabilities, as well as other capabilities not mentioned. An electric vehicle may include one or more switch mode controllers to perform power regulation to a battery during charging operations. A switching frequency of a switch mode controller may be programmatically set. During wireless charging with a base pad, the vehicle switch mode controller may create a ripple envelope on the vehicle pad resonant voltage while still performing power regulation. The frequency of the ripple envelope is the beat frequency between a system operating frequency (e.g., the charging frequency) and the switch mode controller frequency. The ripple envelope will cause the resonant current/voltage in the base to have a similar envelope at the same ripple frequency. The ripple frequency may be detected by a ripple detector and provided to a distribution controller. The detected ripple frequency on a particular base may be used to identify the vehicle that is currently on top of it. The distribution controller may use the ripple frequency to pre-arrange charging operations in a Base Array Network (BAN). Overloading of a backbone power supply in the BAN may be prevented. The frequency of the switch mode controller may be used to determine the switching duty cycle. The magnitude of the ripple envelope may be used to determine the switching duty cycle. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

Figure 1:
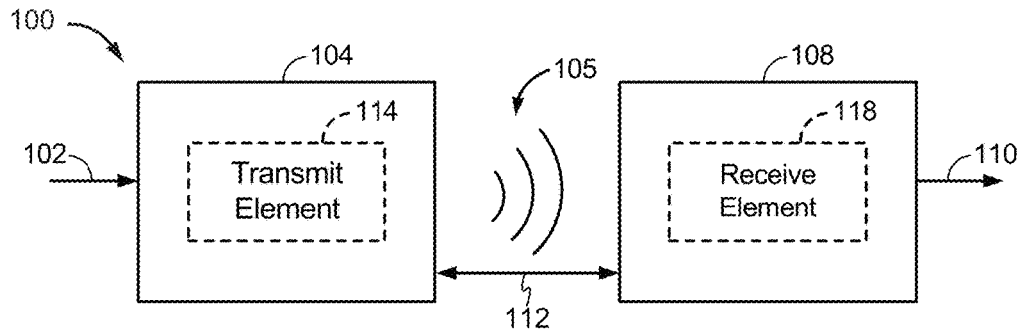
FIG. 1 is a functional block diagram of an example wireless power transfer system.

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive coupler" to achieve power transfer. The transmitter transfers power to the receiver through a wireless coupling of the transmitter and receiver.

An electric vehicle is used herein to describe a remote system, an example of which is a vehicle that includes, as part of its motion capabilities, electrical power derived from a chargeable energy storage device (e.g., one or more rechargeable electrochemical cells or other type of battery). As non-limiting examples, some electric vehicles may be hybrid electric vehicles that include a traditional combustion engine for direct locomotion or for charging the vehicle's battery in addition to electric motors. Other electric vehicles may draw all locomotive ability from electrical power. The electric vehicle is not limited to an automobile and may include motorcycles, carts, scooters, and the like. By way of example and not limitation, a remote system is described herein in the form of the electric vehicle (EV). Furthermore, other remote systems that may be at least partially powered using a chargeable energy storage device are also contemplated (e.g., electronic devices such as personal computing devices and the like).

The terminology used herein is for the purpose of describing particular implementations only and is not intended to be limiting of the disclosure. It will be understood that if a specific number of a claim element is intended, such intent will be explicitly recited in the claim, and in the absence of such recitation, no such intent is present. For example, as used herein, the singular forms "a," "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

FIG. 1 is a functional block diagram of an example of a wireless power transfer system 100. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (not shown in this figure) that is coupled to receive the output power 110. The transmitter 104 and the receiver 108 are separated by a non-zero distance 112. The transmitter 104 includes a power transmitting element 114 configured to transmit/couple energy to the receiver 108. The receiver 108 includes a power receiving element 118 configured to receive or capture/couple energy transmitted from the transmitter 104.

The transmitter 104 and the receiver 108 may be configured according to a mutual resonant relationship. When the resonant frequency of the receiver 108 and the resonant frequency of the transmitter 104 are substantially the same, transmission losses between the transmitter 104 and the receiver 108 are reduced compared to the resonant frequencies not being substantially the same. As such, wireless power transfer may be provided over larger distances when the resonant frequencies are substantially the same. Resonant inductive coupling techniques allow for improved efficiency and power transfer over various distances and with a variety of inductive power transmitting and receiving element configurations.

The wireless field 105 may correspond to the near field of the transmitter 104. The near field corresponds to a region in which there are strong reactive fields resulting from currents and charges in the power transmitting element 114 that do not significantly radiate power away from the power transmitting element 114. The near field may correspond to a region that up to about one wavelength, of the power transmitting element 114. Efficient energy transfer may occur by coupling a large portion of the energy in the wireless field 105 to the power receiving element 118 rather than propagating most of the energy in an electromagnetic wave to the far field.

The transmitter 104 may output a time-varying magnetic (or electromagnetic) field with a frequency corresponding to the resonant frequency of the power transmitting element 114. When the receiver 108 is within the wireless field 105, the time-varying magnetic (or electromagnetic) field may induce a current in the power receiving element 118. As described above, with the power receiving element 118 configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge an energy storage device (e.g., a battery) or to power a load.

Figure 2:
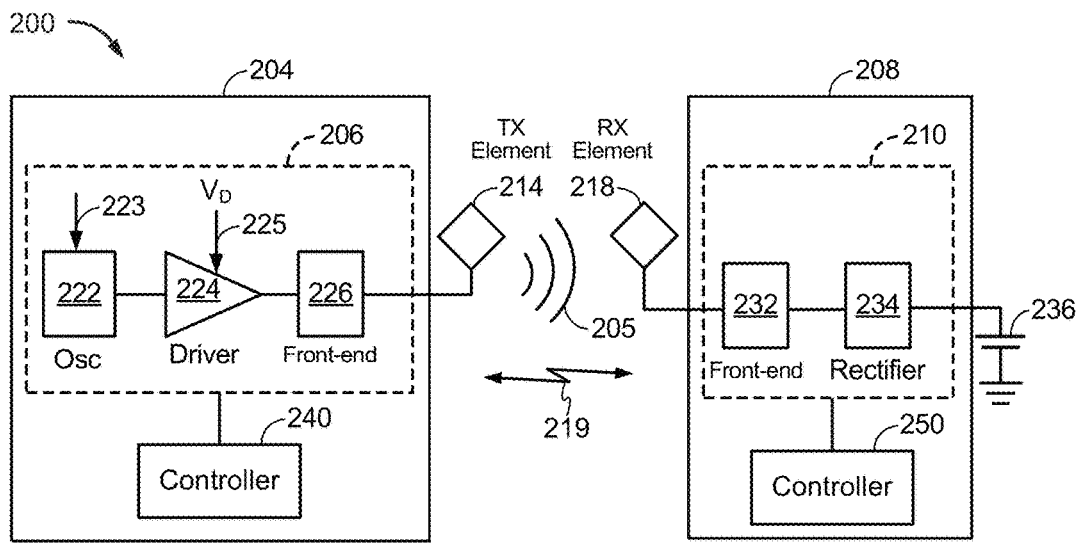
FIG. 2 is a functional block diagram of another example of a wireless power transfer system.

FIG. 2 is a functional block diagram of an example of a wireless power transfer system 200. The system 200 includes a transmitter 204 and a receiver 208. The transmitter 204 (also referred to herein as power transmitting unit, PTU) is configured to provide power to a power transmitting element 214 that is configured to transmit power wirelessly to a power receiving element 218 that is configured to receive power from the power transmitting element 214 and to provide power to the receiver 208. Despite their names, the power transmitting element 214 and the power receiving element 218, being passive elements, may transmit and receive power and communications.

The transmitter 204 includes the power transmitting element 214, transmit circuitry 206 that includes an oscillator 222, a driver circuit 224, and a front-end circuit 226. The power transmitting element 214 is shown outside the transmitter 204 to facilitate illustration of wireless power transfer using the power transmitting element 214. The oscillator 222 may be configured to generate an oscillator signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a switching amplifier configured to receive a square wave from the oscillator 222 and output a sine wave.

The front-end circuit 226 may include a filter circuit configured to filter out harmonics or other unwanted frequencies. The front-end circuit 226 may include a matching circuit configured to match the impedance of the transmitter 204 to the impedance of the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or powering a load.

The transmitter 204 further includes a controller 240 operably coupled to the transmit circuitry 206 and configured to control one or more aspects of the transmit circuitry 206, or accomplish other operations relevant to managing the transfer of power. The controller 240 may be a microcontroller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by the controller 240. The transmitter 204 may further include a memory (not shown) configured to store data, for example, such as instructions for causing the controller 240 to perform particular functions, such as those related to management of wireless power transfer.

Figure 3:
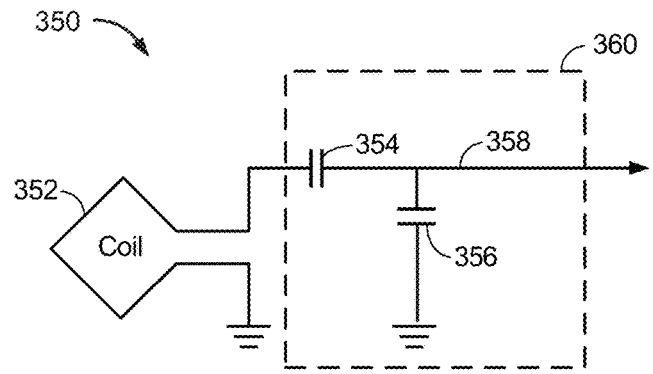
FIG. 3 is a schematic diagram of a portion of transmit circuitry or receive circuitry of FIG. 2 including a transmit or receive coil.

The receiver 208 includes the power receiving element 218, and receive circuitry 210 that includes a front-end circuit 232 and a rectifier circuit 234. The power receiving element 218 is shown outside the receiver 208 to facilitate illustration of wireless power transfer using the power receiving element 218. The front-end circuit 232 may include matching circuitry configured to match the impedance of the receive circuitry 210 to the impedance of the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 3. The receiver 208 and the transmitter 204 may additionally communicate on a separate communication channel 219 (e.g., BLUETOOTH, ZIGBEE, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. The transmitter 204 may be configured to generate a predominantly non-radiative field with a direct field coupling coefficient (k) for providing energy transfer. The receiver 208 may directly couple to the wireless field 205 and may generate an output power for storing or consumption by a battery (or load) 236 coupled to the output or receive circuitry 210.

The receiver 208 further includes a controller 250 that may be configured similarly to the transmit controller 240 as described above for managing one or more aspects of the wireless power receiver 208. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to try to minimize transmission losses between the transmitter 204 and the receiver 208.

FIG. 3 is a schematic diagram of an example of a portion of the transmit circuitry 206 or the receive circuitry 210 of FIG. 2. While a coil, and thus an inductive system, is shown in FIG. 3, other types of systems, such as capacitive systems for coupling power, may be used, with the coil replaced with an appropriate power transfer (e.g., transmit and/or receive) element. As illustrated in FIG. 3, transmit or receive circuitry 350 includes a power transmitting or receiving element 352 and a tuning circuit 360. The power transmitting or receiving element 352 may also be referred to or be configured as an antenna such as a "loop" antenna. The term "antenna" generally refers to a component that may wirelessly output energy for reception by another antenna and that may receive wireless energy from another antenna. The power transmitting or receiving element 352 may also be referred to herein or be configured as a "magnetic" antenna, such as an induction coil (as shown), a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil and/or other inductor forming the power transmitting or receiving element 352. Capacitance (e.g., a capacitor) may be provided by the tuning circuit 360 to create a resonant structure at a desired resonant frequency. As a non-limiting example, the tuning circuit 360 may comprise a capacitor 354 and a capacitor 356, which may be added to the transmit or receive circuitry 350 to create a resonant circuit.

The tuning circuit 360 may include other components to form a resonant circuit with the power transmitting or receiving element 352. As another non-limiting example, the tuning circuit 360 may include a capacitor (not shown) placed in parallel between the two terminals of the circuitry 350. Still other designs are possible. For example, the tuning circuit in the front-end circuit 226 may have the same design (e.g., 360) as the tuning circuit in the front-end circuit 232. Alternatively, the front-end circuit 226 may use a tuning circuit design different than in the front-end circuit 232.

Many current wireless vehicle charging systems require the electric vehicle being charged to be stationary, i.e., stopped near or above the base coil such that the electric vehicle maintains presence within the wireless field generated by the base coil. Thus, while the electric vehicle is being charged by such a wireless charging system, the electric vehicle may not be used for transportation. Dynamic wireless charging systems that are capable of transferring power across free space may overcome some of the deficiencies of stationary wireless charging stations.

For example, the electric vehicle may travel along a roadway having a dynamic wireless charging system. The dynamic wireless charging system may comprise a plurality of the base coils placed linearly along a path of travel. The electric vehicle may request the dynamic wireless charging system activate the base coils along the electric vehicle's path of travel. Such dynamic charging may also serve to reduce or eliminate the need for auxiliary or supplemental motor systems in addition to the electric locomotion system of the electric vehicle (e.g., a secondary gasoline engine of the hybrid/electric vehicle).

Figure 4:
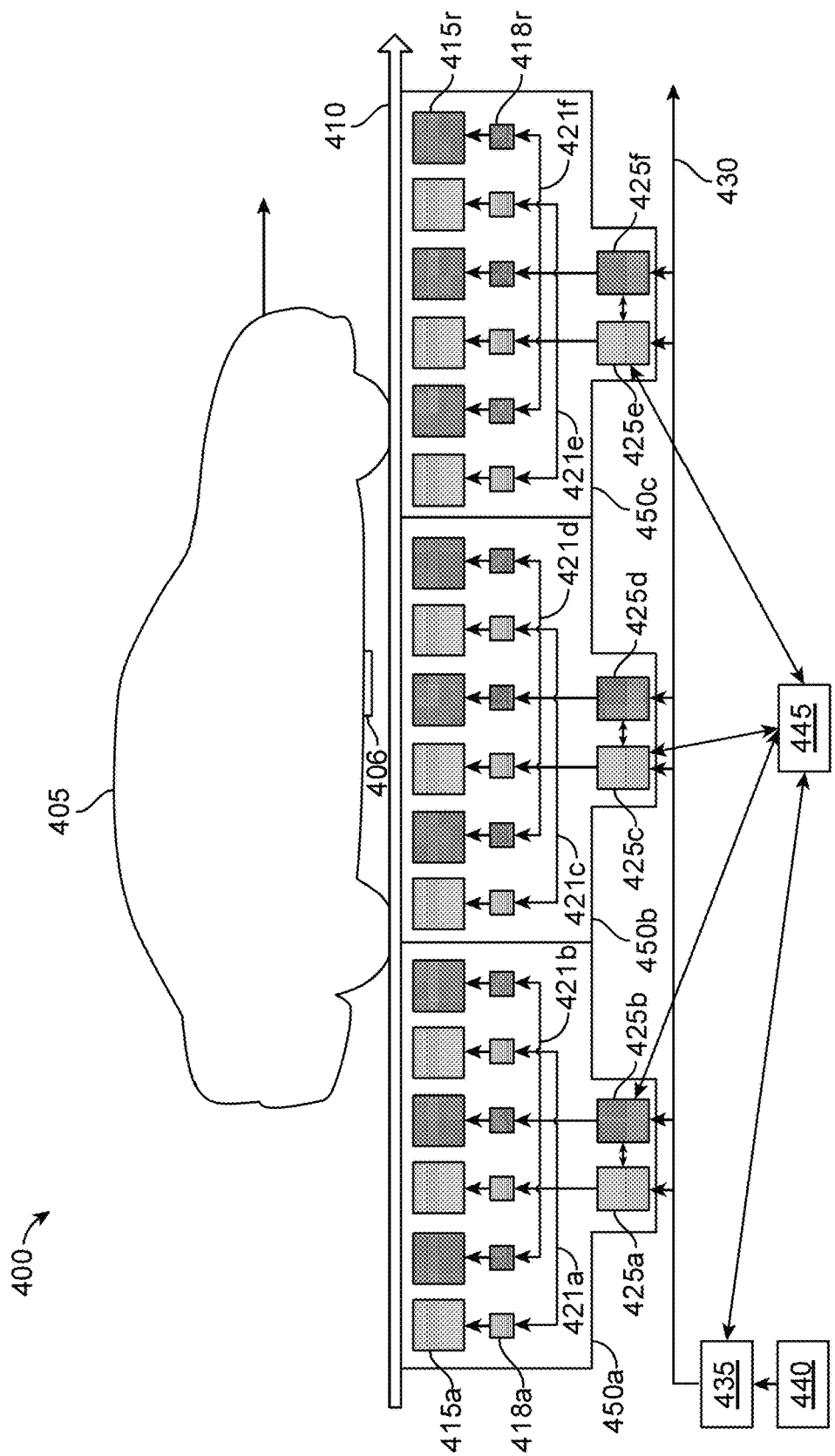
FIG. 4 illustrates a functional block diagram of an electric vehicle with at least one vehicle coil in the presence of a wireless power transfer system.

Referring to FIG. 4, a functional block diagram of an electric vehicle 405 with at least one vehicle coil 406 in the presence of a wireless power transfer system 400 is shown. As shown in FIG. 4, various components of a distribution network of a wireless power transfer system 400 are installed beneath, along or beside a roadway 410. The roadway 410 extends from the left side of FIG. 4 to the right side of FIG. 4, with a direction of travel of the electric vehicle 405 aligned with the roadway 410. The electric vehicle 405 may comprise at least one vehicle coil 406, similar to the receivers 108/208, as previously described in connection with FIGS. 1 and 2, respectively. In some implementations, the at least one vehicle coil 406 may comprise a polarized coupling system (e.g., a double-D coil), a quadrature coil system, combined double-D quadrature coil system ("DDQ"), or any other system utilizing any other type or shape of coil (e.g., circular, rectangular, or solenoid shaped coils). A vehicle coil 406 (secondary coil) may couple with the magnetic field emitted by the primary coil to receive flux. In some implementations, the vehicle coil 406 (secondary coil) may be selected to compliment the primary coil(s) so as to couple with as much of the magnetic field to maximize the received flux. If the primary coil is producing polarized (i.e., horizontal) flux, then a polarized type of vehicle coil 406 may be used in the coupling system (e.g., a double-D coil or a solenoid); alternatively, if the primary coil is producing vertical flux, then a circular coil or a quadrature coil may be used. If the primary coil is producing a combination of horizontal and vertical flux, then a combination vehicle coil 406 may be used, e.g., a DDQ coil. The "double-D" may refer to placing two D-shaped coils back to back.

The dynamic wireless charging system 400 may comprise a plurality of base pad driving units 415a-415r installed in, on, beside, or flush with the roadway 410. Each of the plurality of base pad driving units 415a-415r may be configured to generate a wireless field (see the wireless field 205 of FIG. 2) for wirelessly transferring power to the electric vehicle 405 via the at least one vehicle coil 406 when activated. Each of a plurality of switches 418a-418r may be configured to operationally connect a respective one of the base pad driving units 415a-415r to one of a plurality of local controllers 425a-425f via one of a plurality of distribution circuits 421a-421f. The local controllers 425a-425f may be configured to wirelessly receive power from a power supply/inverter 435, via an alternating current (AC) power backbone 430, and control an amount of power transferred to one or more of the plurality of base pad driving units 415a-415f via the switches 418a-418r. The power supply/inverter 435 may receive its power from a power source 440. The power source 440 and/or the power supply/inverter 435 may be sized based on a number of base pad driving units 415 to power, a number of local controllers 425, and/or a number and type of electric vehicles 405 to be charged. The power source 440 and power supply/inverter 435 may provide current at a frequency utilized by the base pad driving units 415 or, alternatively, at some higher or lower frequency. The AC power backbone 430 may comprise a loop conductor that distributes the high frequency (HF) power and may be capable of synchronizing the base pad driving units 415 and/or the local controllers 425 that are near each other to a single phase. Thus, the AC power backbone 430 may be considered a phase reference that also distributes power. Although only one power backbone 430 is shown, the present application additionally contemplates the use of multiple separate power backbones for powering different coils within a particular BAN and/or for powering different Base Array Networks (BANs) along the roadway.

A distribution controller 445 may be a computerized device in communication with the power supply/inverter 435 and the local controllers 425a-425f and may be configured to provide global coordination of power control between the local controllers 425a-425f. Groups of the base pad driving units 415, the switches 418, and the local controllers 425 may comprise a series of individual Base Array Network (BAN) modules 450a-450c. The respective components of the BAN modules 450 are shaded to indicate respective common current paths.

As the electric vehicle 405 travels along the roadway 410, the distribution controller 445 may communicate with one or more of the electric vehicle 405, the power supply/inverter 435, and the local controllers 425a-425f to coordinate activation or deactivation of particular ones of the base pad driving units 415a-415r. For example, the distribution controller 445 may command the power supply/inverter 435 to generate a current and distribute the current to the AC power backbone 430. The AC power backbone 430 may utilize the distributed current to wirelessly supply power to the local controllers 425a-425f via a "double couple transformer" that wirelessly couples energy from the AC power backbone 430 and wirelessly couples energy to each of the respectively connected local controllers 425a-425f.

The local controllers 425a-425f may receive the power from the AC power backbone 430 and provide a regulated amount of current to one or more of the base pad driving units 415a-415r. In some implementations, the local controllers 425 in each BAN module 450 may comprise individual control units capable of independent control from each other. Alternatively, the local controllers 425 of each BAN module 450 may comprise a single, shared control unit or processor. The base pad driving units 415a-415r may generate wireless fields according to the current received via the respective switch 418a-418r from the local controller 425a-425f and may couple to the at least one vehicle coil 406 to wirelessly transfer power to the electric vehicle 405.

Depending on the particular implementation, control of activation of the base pad driving units 415 may be shared to differing degrees between the distribution controller 445 and the local controllers 425a-425f. For example, in some implementations, the distribution controller 445 may coordinate the activation and deactivation of the base pad driving units 415a-415r and may coordinate any communications or actions between multiple BAN modules 450a-450c. In some other implementations, the distribution controller 445 may simply coordinate communications between the BAN modules 450a-450c or local controllers 425a-425f, while the local controllers 425a-425f may control the base pad driving units sequencing. In yet other implementations, the distribution controller 445 may activate a particular BAN module 450a-450c, but leave timing of the base pad driving unit activations to the associate local controller(s) 425a-425f. In yet other implementations, the distribution controller 445 may communicate only non-critical information to the local controllers 425a-425f and not provide base pad driving unit activation information.

Higher level coordination by the distribution controller 445, combined with the more localized current distribution and regulation at the local controllers 425a-425f may create a more responsive dynamic wireless charging system 400 with decentralized control via the local controllers 425a-425f. This may allow the local controllers 425a-425f to control current flow independently of the distribution controller 445 and allow local control of impedance matching and reactive voltage/amperage (VAr) loading. Such localized control may provide a decreased VAr load compensation response time since instructions need only come from the local controller 425a-425f and not from the distribution controller 445.

The distribution controller 445 may also obtain information regarding the velocity and/or location of the electric vehicle 405 for controlling activation of particular ones of the base pad driving units 415a-415r. The distribution controller 445 may obtain this information from the electric vehicle 405 or from various sensors or load analysis of the base pad driving units 415a-415r. In other implementations, each of the BAN modules 450a-450c may sense the presence of the electric vehicle 405 and autonomously and selectively activate the appropriate base pad driving units 415a-415r according to a detected presence or location of the electric vehicle 405. In yet other implementations, the BAN modules 450a-450c may receive a signal comprising information regarding the electric vehicle 405 velocity and/or position or an activation command from a neighboring BAN module. The received signal may come directly from the neighboring BAN module (e.g., a corresponding local controller 425) or via the distribution controller 445.

When a respective local controller 425 receives a signal from the distribution controller 445 to activate a specific base pad driving unit 415, the respective local controller 425 may activate the switch 418 corresponding to the specific base pad driving unit 415. As the vehicle 405 continues in the direction of travel, the local controllers 425a-425f may receive commands from the distribution controller 445 to activate or deactivate specific base pad driving units 415a-415r based on the position of the vehicle coil 406. The local controllers 425a-425f may further control or regulate the current from the AC power backbone 430.

As depicted, the base pad driving units 415 from consecutive local controllers 425 may be interleaved or interlaced such that a single local controller 425 may provide power to alternating base pad driving units 415. Thus, the base pad driving units 415 from a first local controller 425 may be proximally interleaved with the base pad driving units 415 controlled by a second local controller 425 when the two local controllers 425 are within the same BAN 450. Thus, alternating base pad driving units 415 may be powered by different local controllers 425 and one local controller need not simultaneously power two adjacent base pad driving units 415. Additionally, preventing a single local controller 425 from providing current to consecutive or adjacent base pad driving units 415 may reduce power rating requirements of individual components, as each component need only be capable of handling the current load of a single base pad driving unit 415 at a given time.

A wireless power transfer system having unbalanced reactive power loading may be able to transfer less power than a system having a balanced reactive power loading between the power source (e.g. the AC power backbone 430) and the load, or receiver (e.g., the base pad driving units 415). For example, unbalanced reactive power may result in thermal losses, voltage differences between the source and sink, and a decrease in voltage stability, among other factors. Accordingly, in some implementations, the local controllers 425a-425f may each comprise a tuning circuit or network to tune the current, and consequently the power, available to currently activated base pad driving unit(s) 415. Such tuning circuits may allow for maintaining an optimum, or balanced VAr of the wireless charging system 400 within a small range (e.g., +/−5%) of the designed power tuning value.

In an exemplary dynamic wireless charging system, there may be a number of factors that impact the power supply tuning network. Certain systems may suffer from tuning capacitor aging. As a capacitor ages, the capacitive characteristics of the component may diminish. In an implementation, the AC power backbone 430 may vary in length, affecting the overall VAr loading of the system. In an implementation, various vehicle tuning topologies may affect the AC power backbone 430 VAr loading in different ways, reflecting different amounts of reactive power load back to the AC power backbone 430 (e.g., based on the vehicle charging system design).

In an implementation, the tuning circuit or network may be configured to function with only one base pad driving unit 415 activated. In another implementation, the tuning circuit or network may be configured to function with multiple base pad driving units 415 being activated or be applied to one or more of the BANs 450a-450c. In another implementation, the tuning circuit or network may be configured to function with a single base pad driving unit 415 or with multiple base pad driving units 415 being activated and receiving a current from a respective local controller 425.

FIG. 4 shows six base pad driving units 415 within each BAN 450a-450c. Cost estimates for the magnetics/circuit design shown in FIG. 4 may be expensive. Accordingly, the present application contemplates implementations where each BAN may comprise not six, but three coils, as will be described in more detail in connection with FIG. 5 below. This design may reduce component count, reduce the number of coils or couplers per meter of roadway charging apparatus, and may reduce the physical footprint of the BANs. This may have the additional benefits of reducing the installation costs as well as reducing the volume occupied by the BANs.

Figure 5:
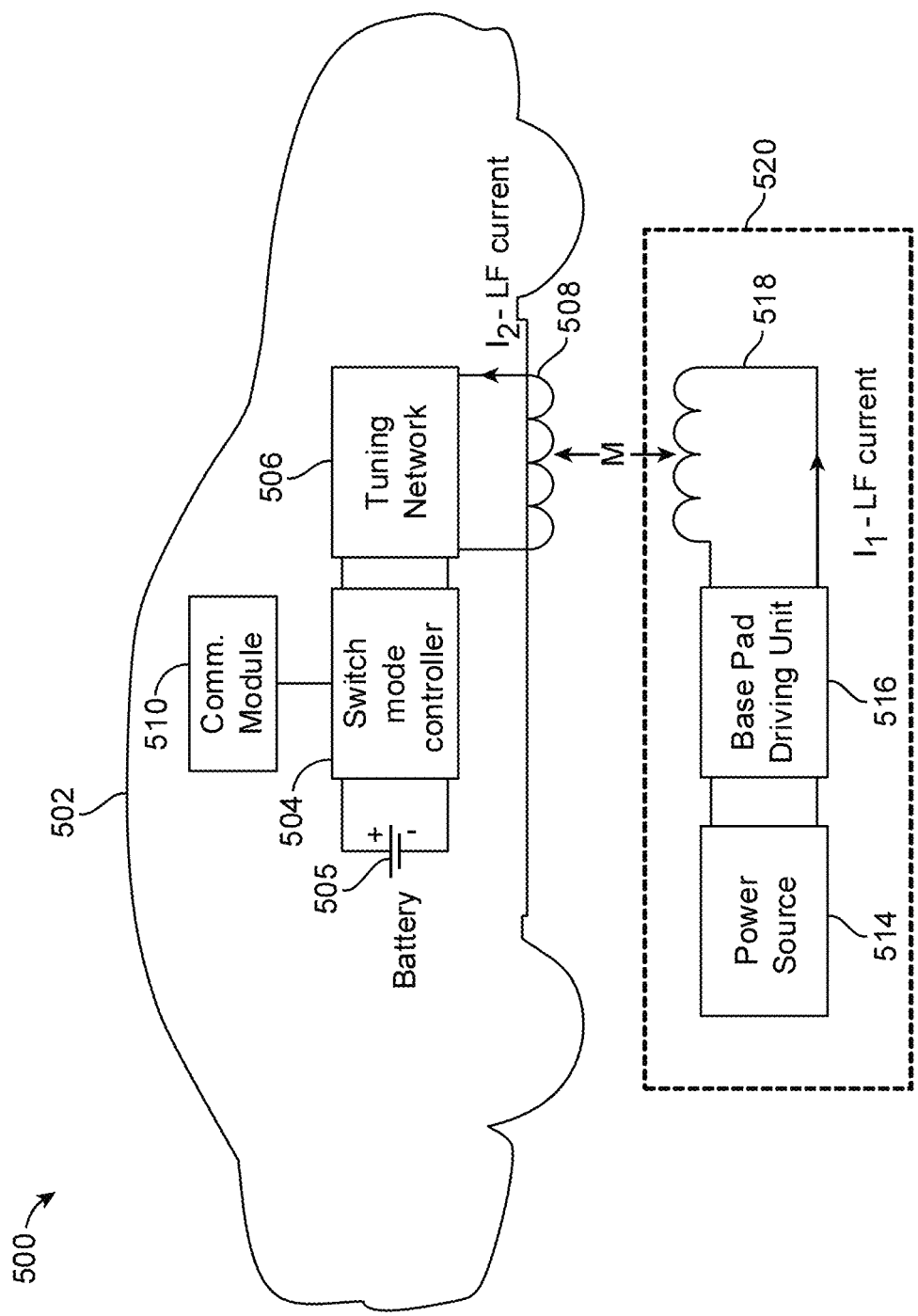
FIG. 5 shows a coupling arrangement of an electric vehicle with a switch mode controller and a charging base pad.

Referring to FIG. 5, a diagram 500 of a coupling arrangement of an electric vehicle with a switch mode controller and a charging base pad is shown. An electric vehicle 502 includes a switch mode controller 504, a battery 505, a tuning network 506 and a communications module 510. The diagram 500 only includes those components required for an understanding of the interaction between the electric vehicle 502 and a charging base pad 520, and may have any number of additional components, switches, and/or arrangements of the described components. The term base pad as used herein may also be referred to as a transmitter, a wireless power transmitter, or an inductive power transfer coil. The charging base pad 520 is an example of a transmitter means. A vehicle coil 508 and a corresponding tuning network 506 are configured to magnetically couple with a base pad driving unit 516 via a transmitting coil 518 in the base pad 520. For example, the tuning network 506 and the base pad driving unit 516 may include the transmit circuitry 206 and the receive circuitry 210 of FIG. 2. The base pad 520 may be an example of static charging station (e.g., in a parking structure), or a dynamic charging station (e.g., an element in a BAN). A power source 514 represents a source for an injection of alternating current into the transmitting coil 518 (i.e., $I_1$), such as provided by the power source 445, the power supply/inverter 435, and the backbone 430. The switch mode controller 504 represents a switched-mode power supply configured to provide electrical power to the battery 505 via one or more switching regulators. The magnetic coupling between the vehicle coil 508 and the transmitting coil 518 induces a current in the vehicle coil 508 (i.e., $I_2$). The switch mode controller 504 receives the alternating current from the tuning network 506 and provides a regulated direct current voltage to the battery 505. In general, the switch mode controller 504 may operate at a frequency between 70 kHz and 90 kHz. The frequency of operation in the switch mode controller 504 may be programmable. The communications module 510 is operably coupled to the switch mode controller 504 and may be configured to receive the current switch mode controller frequency from the switch mode controller 504. In operation, the switch mode controller 504 and the communications module 510 may be part of a computerized device such as Vehicle Control Unit (VCU) assembly. In an example, the communications module 510 may provide a desired switch mode controller frequency and the switch mode controller 504 is configured to operate at the desired frequency. The communications module 510 may contain one or more wireless transceiver(s) which are capable of sending and receiving wireless signals over a wireless network based on one or more wireless standards such as WAN standards such as CDMA, GSM, CDMA 2000, WCDMA, UMTS, and LTE and Wireless LAN and short range wireless standards such as WiFi, Bluetooth and Zigbee. A networked resource (not shown in FIG. 5) may be configured to exchange switch mode controller frequency information with the communication module. In an embodiment, the vehicle 502 may include two vehicle coils 508 (e.g., a forward coil and a rear coil) and two corresponding switch mode controllers 504 (e.g., a controller for the forward coil and a controller for the rear coil).

Figure 6:
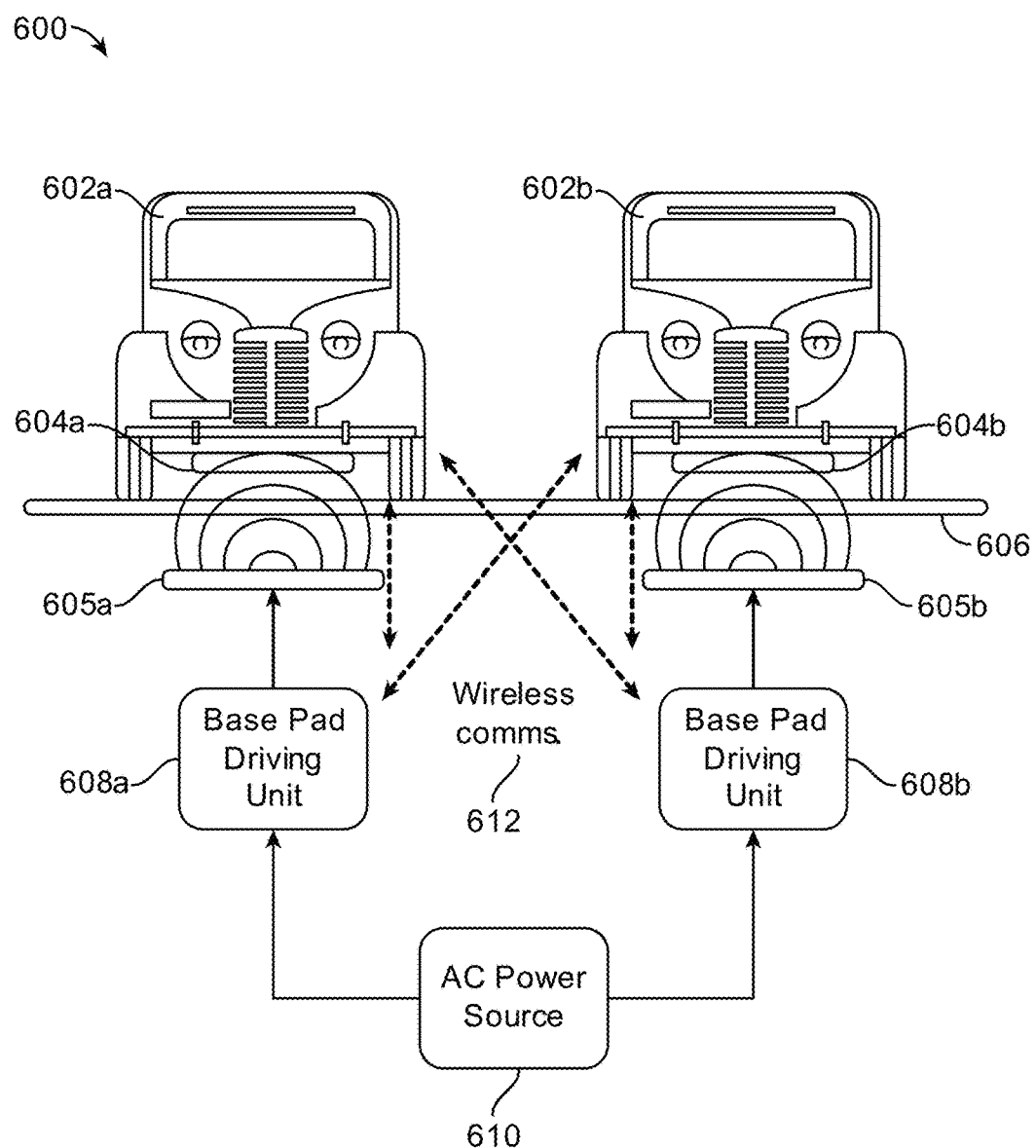
FIG. 6 illustrates an example multivehicle wireless power transfer system in a static charging solution.

Referring to FIG. 6, an illustration 600 of a multivehicle wireless power transfer system is shown. The illustration 600 includes a first vehicle 602a with a first vehicle coil 604a, and a second vehicle 602b with a second vehicle coil 604b. The vehicles 602a-b are located on a charging area 606, such as a parking lot or other static charging example. The charging area 606 includes a first base pad coil 605a operably coupled to a first base pad driving unit 608a, and a second charging pad coil 605b operably coupled to a second base pad driving unit 608b. The first and second base pad driving units are configured to receive power from an AC power source 610. The base pad driving units 608a-b may be configured to provide power based on communications received from a vehicle on the corresponding charging pad. Ideally, the first base pad driving unit 608a establishes a wireless communication link 612 with the first vehicle 602a, the second base pad driving unit 608b establishes a wireless communication link 612 with the second vehicle 602b. The wireless communication link 612 may be based on short range wireless standards such as WiFi, Bluetooth and Zigbee. In reality, however, due to the proximate locations of the vehicles 602a-b and the base pads 605a-b, the wireless communication link 612 may cross-link a base pad driving unit with an incorrect vehicle. For example, the communication link 612 may associate the first vehicle 602a with the second base pad driving unit 608b, and vice versa. Such a cross-linking of communications may prevent a charging pad from discovering the identity of the vehicle that it is coupling with. To the extent the wireless communication link 612 is configured to convey charging information (e.g., current charge level, requested charge rate, coupling frequency, etc. . . . ), the cross-linking of the base pads/driving units with the wrong vehicle may impact the performance and safe operation of the charging station. The problems associated with cross-linking communications and vehicle identification are increased for dynamic charging solutions involving multiple vehicles and central base charging control units. Further, the latency of wireless communication channels can exacerbate the cross-linking problems and hinder the base side current control in dynamic charging solutions.

Figure 7:
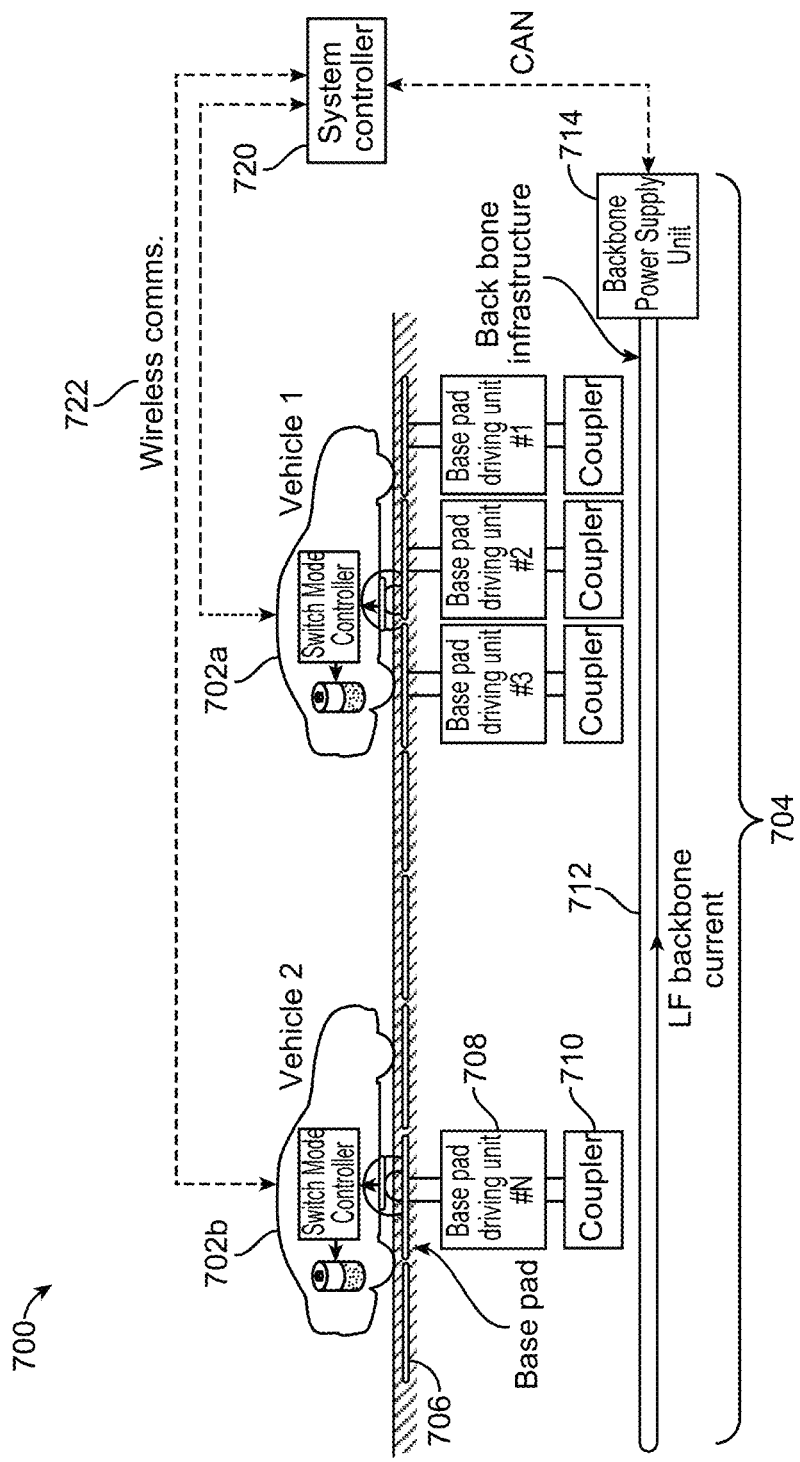
FIG. 7 illustrates an example multivehicle wireless power transfer system in a dynamic charging solution.

Referring to FIG. 7, with further reference to FIG. 5, an illustration 700 of an example multivehicle wireless power transfer system in a dynamic charging solution is shown. The illustration 700 includes a first vehicle 702a and a second vehicle 702b on a block of a base array network (e.g., a BAN block) 704. Each of the vehicles 702a-b includes a switch mode controller, a communication module (not shown), and a battery. The switch mode controller and communications module in the vehicles 702a-b are the switch mode controller 504 and communications module 510 depicted in FIG. 5. The BAN block 704 includes a plurality of base pads 706, with each of the base pads 706 operably coupled to a base pad driving unit 708 and a coupler 710. The base pad driving unit 708 may be operably connected to local controller 425 and/or a distribution controller 445, and the coupler 710 is configured to receive power from a low frequency backbone 712. The local controller 425 and the distribution controller 445 may be computerized devices configured to provide commands to the base pad driving unit 708. The backbone 712 is configured to provide power from a backbone power supply unit 714 to the plurality of couplers 710. While only one backbone power supply unit 714 and backbone 712 are shown in the BAN block 704, a BAN may include multiple BAN blocks. A computerized system controller 720 is an example of a controller means and may be operably connected to one or more BAN blocks 704 via a Control Area Network (CAN) connection. The system controller 720 is also configured to send and receive information to the first and second vehicles 702a, 702b via a wireless communications link 722. The wireless communication link 722 may utilize cellular service, or may be based on a short range protocol such as WiFi, Bluetooth, or ZigBee.

In operation, when the vehicles 702a-b are within the communication range of the system controller 720, they will register with the central system controller 720 via the wireless communication link 722. The base pads 706 are configured to sense the presence of a vehicle and provide power to the vehicle that is currently on top of it. In general, an active base pad and base pad driving unit only knows that it is currently powering a vehicle pad at a measureable power level, but the system controller does not know which vehicle is currently on top of which base pad. In a situation with multiple vehicles in a BAN block 704 with a single backbone power supply unit 714, the addition of one or more vehicles may overload the backbone power supply unit 714. Since the vehicles are moving along the BAN, the latency associated with the wireless communications 722 may inhibit the system controller 720 from efficiently managing power distribution along one or more backbones 712 in the BAN. For example, if the backbone power supply unit 714 is rated for two vehicles, the addition of a third vehicle may cause the backbone power supply unit to overload. Such an overload condition, however, may be avoided if the system controller 720 could identify the vehicles and instruct one or more of the vehicles to reduce their power consumption (i.e., reduce the overall load on the BAN block 704). Further, if the charging solution includes multiple BAN blocks, the system controller 720 can be configured to instruct a vehicle to reduce its power consumption before entering a heavily loaded BAN block. Accurate vehicle identification may provide an opportunity for the system controller 720 to pre-arrange vehicle power management in a multiple vehicle charging solution.

Figure 8:
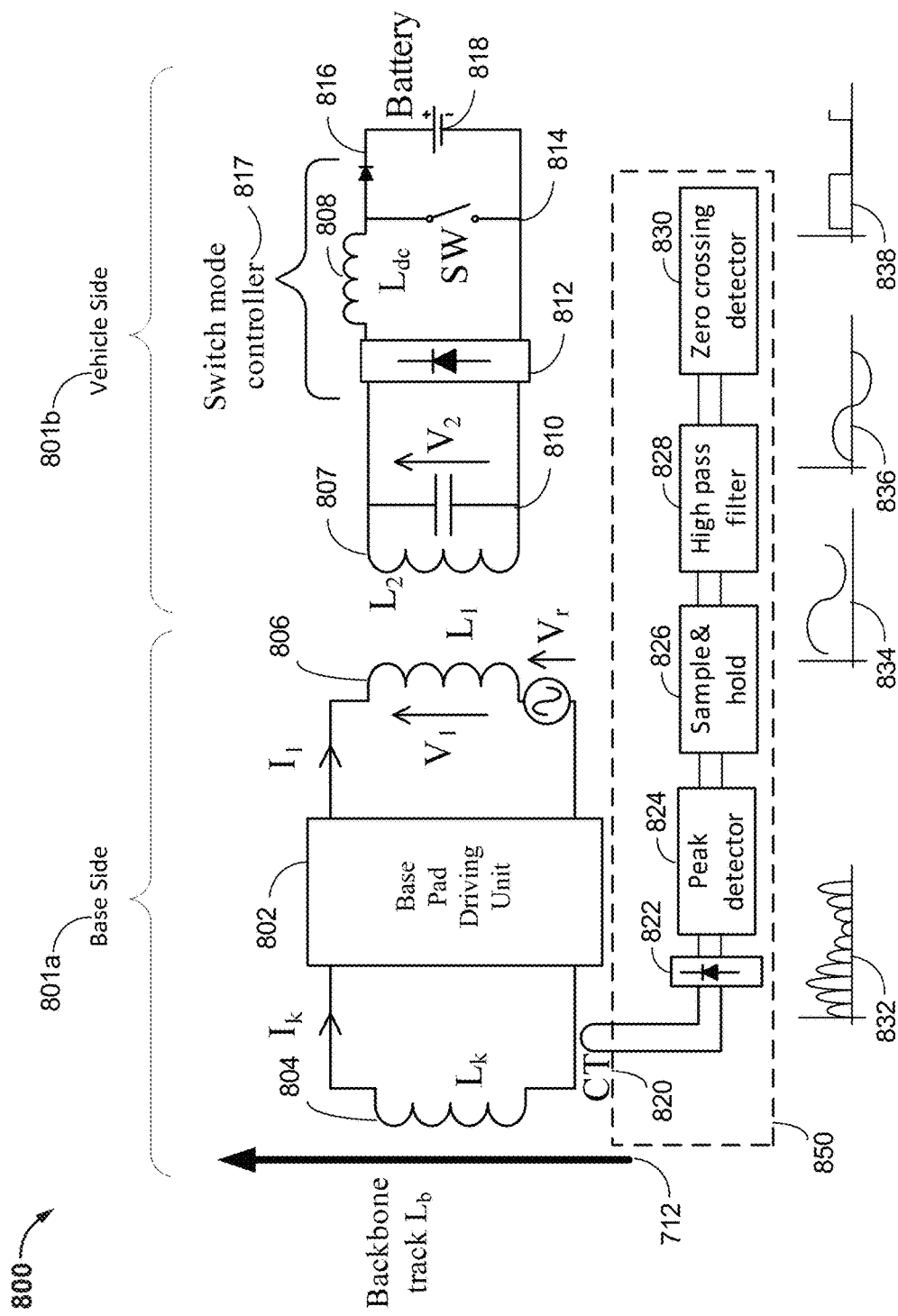
FIG. 8 is a schematic diagram of an example of a base side ripple frequency detection system.

Referring to FIG. 8, with further reference to FIGS. 3, 5 and 7, a schematic diagram 800 of an example of a ripple frequency detection system is shown. The diagram 800 depicts a base side 801a, a vehicle side 801b, a ripple detector 850, and includes only includes those components required for an understanding of the base side ripple frequency detection system as will be described below, and may have any number of additional components, switches, and/or arrangements of the described components. The base side 801a is an example of a transmitter means. The base side 801a may include the AC power backbone 712 of FIG. 7, and a base pad driving unit 802 as an example of a base pad driving unit 708 of FIG. 7. A coil or coupler 804 on the base side 801a may be configured to receive power from the backbone 712. The base pad driving unit 802 may include the transmit or receive circuitry 350 of FIG. 3 For example, the coupler 804 may be connected in series with a series tuning capacitor 354 and a parallel tuning capacitor 356 may be connected in parallel across the series tuning capacitor 354. The base pad driving unit 802 is configured to apply a current to the base pad coil 806 having a frequency corresponding to the resonant frequency of the base pad coil 806. The base pad driving unit 802 and the base pad coil 806 are an example of a base pad coil circuit. The base pad coil 806 is configured to couple with the vehicle side 801b. For example, a vehicle coil 807 may be disposed over the base pad coil 806 for wireless charging operations. The vehicle coil 807 is an example of a vehicle coil 508 of FIG. 5. A parallel capacitor 810 is included in the vehicle side 801b to form a resonant circuit (e.g., a LC tank circuit in view of the inductive reactance of the vehicle coil 807). Other reactive circuit elements may also be included to provide tuning, filtering and or noise reduction functions (e.g., to reduce electromagnetic interference (EMI)). The vehicle side 801b includes a switch mode controller 817 and a battery 818. In an example, the switch mode controller 817 may be configured as a buck-boost converter including a rectifier circuit 812, an inductor 808, a switch 814, and a diode 816. Additional filtering components may also be included to improve the quality (e.g., reduce the noise) of the direct current output to the battery 818. The rectifier circuit 812 may be a full-bridge rectifier circuit or other rectifying circuit configured to provide AC signal rectification. As an example, and not a limitation, the switch 814 operates at a switching frequency typically in the range of 70 kHz to 90 kHz in electric vehicle operations. The switching frequency and duty cycle of the switch 814 may change based on voltage regulation requirements. The switching frequency is typically fixed based on the electrical characteristics of the switch 814 and the corresponding driving circuits (e.g., gate drivers for field effect transistors (FETs)). The switching frequency may also be varied by the switch mode controller 817 based on other operational requirements (e.g., power consumption, filtering, EMI, user configuration). In an example, the switch mode controller 817 may be operably coupled to a communications module 510 and configured to send and receive operational variables such as a switch mode controller switching frequency.

In operation, the ripple frequency detection system of FIG. 8 enables a method for the system controller 720 to map vehicles with the active base pad. During wireless power transfer operations, a base pad will operate at a system charging frequency. If the frequency of the switch mode controller 817 is not the same as the system charging frequency, or a multiple of the charging frequency, then a ripple envelope at the beat frequency across the vehicle side resonant network will occur. This ripple envelope is present while the switch mode controller 817 is performing power regulation to the battery 818. This resonant voltage ripple envelope will cause the resonant current/voltage in the base side 801a to have a similar envelope at the same ripple frequency. By assigning a different ripple frequency to the vehicle controller, the detected ripple frequency on a particular base can then be used to identify the vehicle that is currently on top it.

In an example, the operating frequency of wireless power transfer system (e.g., the base side 801a and the vehicle side 801b) is set to 85 kHz. The switch mode controller 817 may be configured to utilize a switching frequency for the switch 814 of 75 kHz. Setting this switching frequency creates a 10 kHz beat frequency due to the difference between the system operating (resonance) frequency and the vehicle controller switch mode switching frequency. As a result, a 10 kHz ripple envelope across the vehicle coil 807 resonant voltage V2 is created. This 10 kHz ripple envelope may also be observed on the reflected voltage Vr, the current in the base coil ($I_1$) and the current in the driving coils ($I_k$) as shown in FIG. 8.

The ripple envelope in the base side 801a may be detected by the ripple detector 850 via a current transformer operably coupled to the base side 801a circuitry. The ripple detector 850 is an example of a means for detecting a ripple frequency in a transmitter. In an example, the ripple detector 850 may include a current transformer (CT) 820, a rectifier stage 822, a peak detector stage 824, a sample and hold stage 826, a high pass filter stage 828, and a zero crossing detector stage 830. The ripple detector 850 is typically implemented with analog components, but digital circuits corresponding to the functions of one or more of the stages may also be used. The current transformer 820 is configured to utilize the current flowing through the base side 801a (e.g., including the beat frequency ripple caused by the switch mode controller switching frequency) as an input to the ripple detector 850. The rectifier stage 822 may be a full-bridge rectifier or other rectifier configuration and configured to output a rectified signal 832. Continuing the example above, the peak value of the 85 kHz waveform is sampled. The peak detector stage 824 may include a series connection of a diode and a capacitor configured to output a direct current voltage equal to the peak value of the rectified signal 832 (i.e., the output of the rectifier stage 822). The sample and hold stage 826 may be a sample and hold circuit including a capacitor, a field effect transistor (FET) switch, and an operational amplifier. The sample and hold stage 826 is configured to capture a level of the input signal (e.g., the output of the peak detector stage 824) and hold that value for a specified period of time. The output of the sample and hold stage 826 may be a sample and hold signal 834. The high pass filter stage 828 may be of a passive or active filter design and configure to block the DC component of the sample and hold signal 834 (e.g., the output of the sample and hold stage 826). The output of the high pass filter stage 828 may be a filtered sample and hold signal 836 (i.e., the sample and hold signal 834 without a DC component). In an example, the magnitude of the ripple may be recorded. The zero crossing detector stage 830 may include an operational amplifier comparator circuit configured to output a square wave based on the filtered sample and hold signal 836. The output of the zero crossing detector stage 830 is a square wave signal 838 at a frequency of the difference (e.g., beat frequency) between the wireless power transfer frequency and the switch mode controller 817 switching frequency (i.e., 85 kHz−75 kHz=10 kHz, using the example above). The 10 kHz signal may be used to determine to calculate the switch mode controller 817 switching frequency. The switch mode controller 817 switching frequency may then be used to identify the vehicle corresponding to the vehicle side 801b. The ripple detector 850 enables the identification of a vehicle via the power coupling process. This identification may occur without interrupting the power transfer process. Further, the identification may be detected without using additional components such modulators/demodulators, and mixers required in other communication systems (e.g., amplitude shift keying based solutions).

Figure 9A:
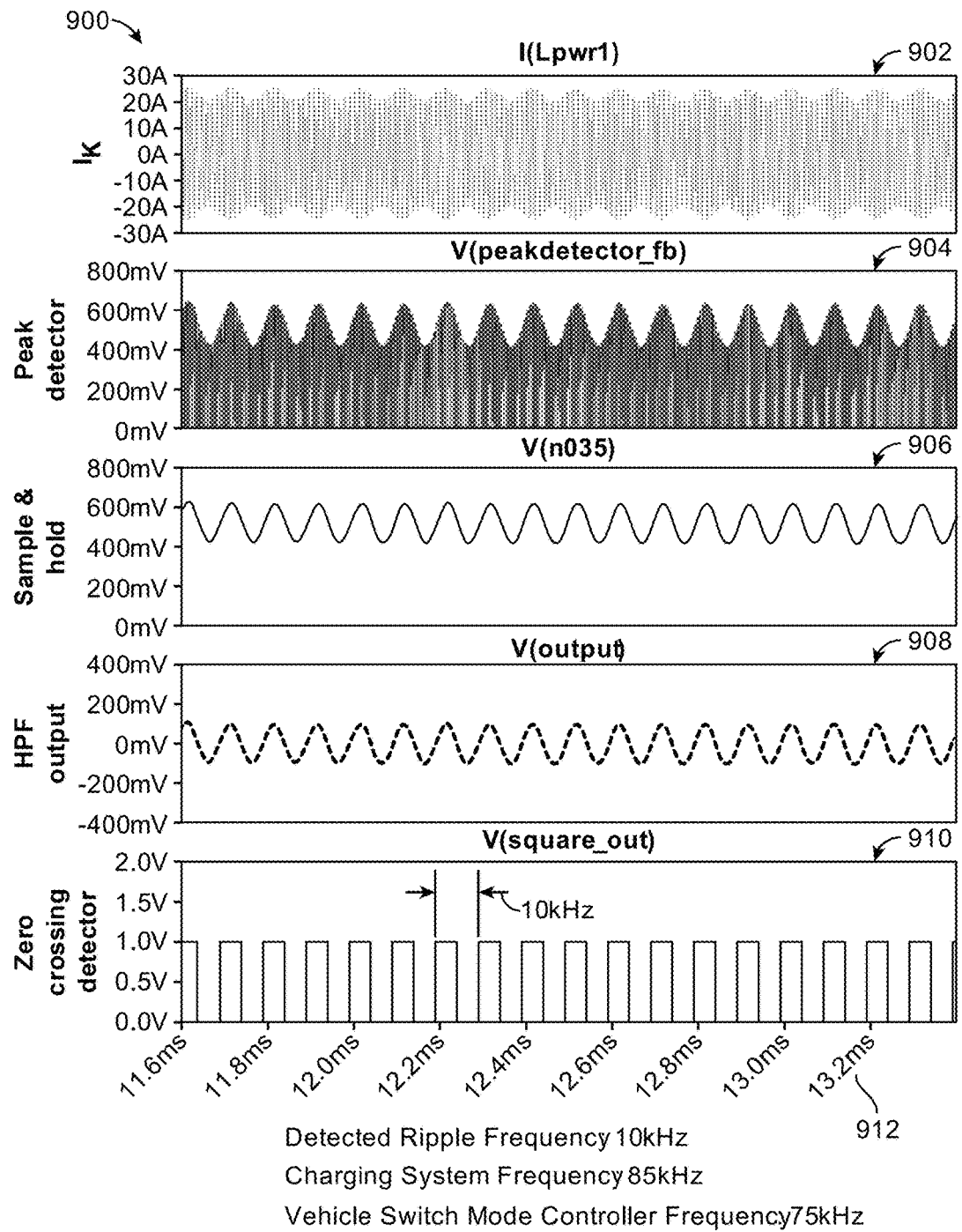
FIG. 9A is an example graphical representation of the stages of base side ripple frequency detection.

Referring to FIG. 9A, with further reference to FIG. 8, a multivariable graphical representation 900 of the stages of base side ripple frequency detection is shown. The multivariable graphical representation 900 includes a driving coil current variable 902, a peak detector variable 904, a sample and hold variable 906, a high pass filter (HPF) output variable 908, and a zero crossing detector variable 910. Each of the variables is plotted on a time axis 912. The variable values and the corresponding graphs are intended to provide a general demonstrate the operation of the ripple detector 850 and may not be to scale. The variables indicated in FIG. 9A are based on a charging system frequency of 85 kHz and the vehicle switch mode controller frequency of 75 kHz. The driving coil current variable ($I_k$) 902 indicates the level of the current in the base side, as detected by the current transformer 820 (e.g., +/−25 Amps). The peak detector variable 904 indicates the peak value of the rectified signal provide by the current transformer 820 (i.e., the output of the peak detector stage 824). For example, the peak values may vary between 400 mV and 600 mV. The sample and hold variable 906 includes the values output by the sample and hold stage 826 and represents the envelope of the ripple in the driving current $I_k$ (e.g., a voltage between 400 mV and 600 mV). The HPF output variable 908 illustrates the ripple envelope (e.g., the output of the sample and hold stage 826) with the DC component removed (e.g., between +/−100 mV). The zero crossing detector variable 910 is the output of the zero crossing detector stage 830 and represents ripple envelope as a square wave with a frequency of 10 kHz (i.e., the frequency of the ripple). Since the charging system frequency is known, the computed frequency of the ripple may be used to determine the vehicle switch mode controller frequency. This identification occurs as a result of normal coupling and does not interrupt the power transfer process.

Figure 9B:
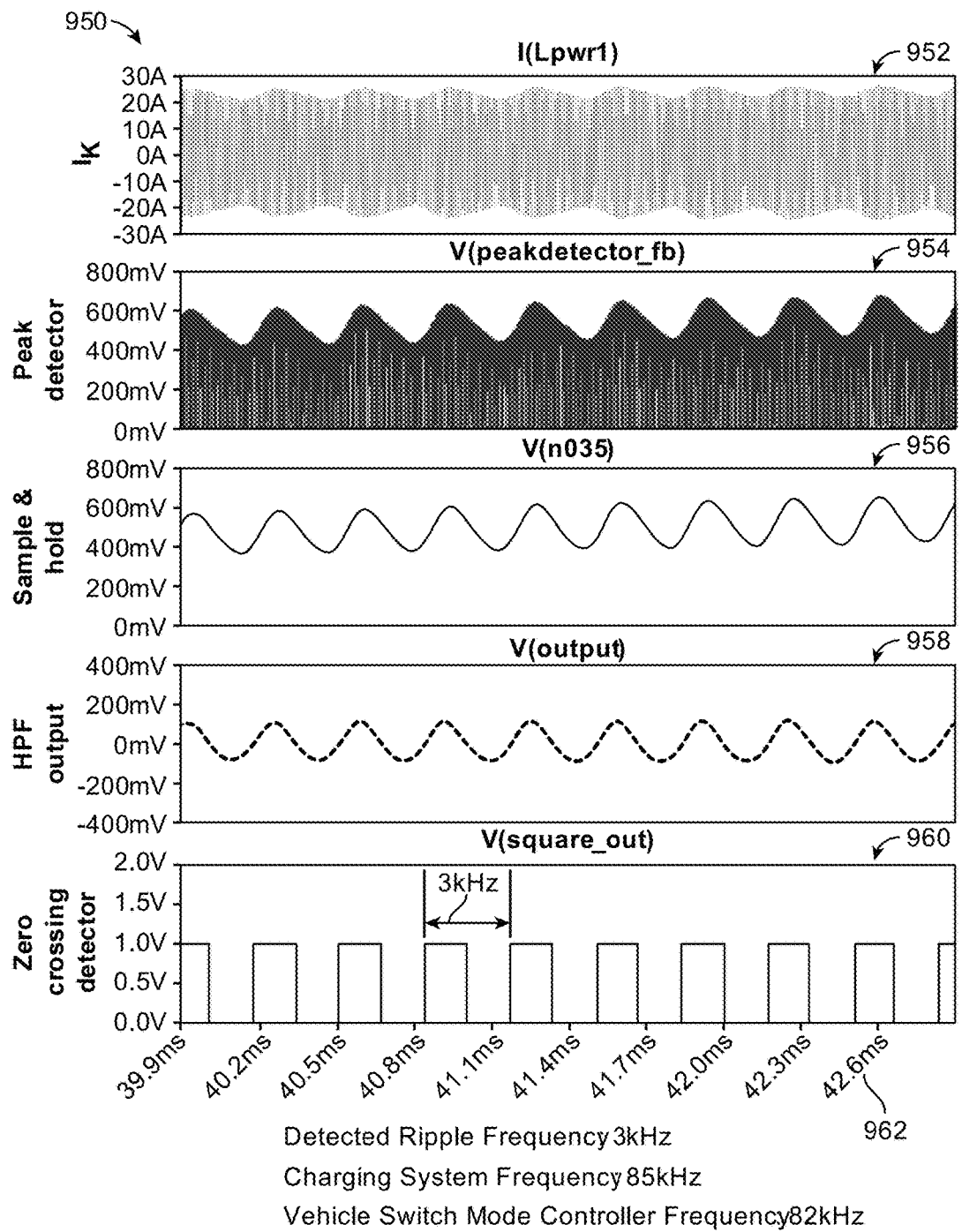
FIG. 9B is another example graphical representation of the stages of base side ripple frequency detection.

Referring to FIG. 9B, with further reference to FIG. 8, another multivariable graphical representation 950 of the stages of base side ripple frequency detection is shown. The multivariable graphical representation 950 depicts an example of ripple detection when the vehicle switch mode controller frequency is 82 kHz rather than the 75 Hz in FIG. 9A. The graphical representation 950 includes a driving coil current variable 952, a peak detector variable 954, a sample and hold variable 956, a high pass filter (HPF) output variable 958, and a zero crossing detector variable 960. Each of the variables is plotted on a time axis 962. As with FIG. 9A, the variable values and corresponding graphs indicated in the multivariable graphical representation 950 are intended to provide a general demonstration of the operation of the ripple detector 850 and may not be to scale. The driving coil current variable ($I_k$) 952 indicates the level of the current in the base side, and as detected by the current transformer 820 (e.g., +/−25 Amps). The peak detector variable 954 indicates the peak value of the rectified signal provide by the current transformer 820 (i.e., the output of the peak detector stage 824). For example, the peak values may vary between 400 mV and 600 mV. The sample and hold variable 956 includes the values output by the sample and hold stage 826 and represents the envelope of the ripple in the driving current $I_k$ (e.g., a voltage between 400 mV and 600 mV). The HPF output variable 958 illustrates the ripple envelope (e.g., the output of the sample and hold stage 826) with the DC component removed (e.g., between +/−100 mV). The zero crossing detector variable 960 is the output of the zero crossing detector stage 830 and represents ripple envelope as a square wave with a frequency of 3 kHz (i.e., the frequency of the ripple). This computed ripple frequency (i.e., 3 kHz) may be subtracted from the known charging system frequency (i.e., 85 kHz) to determine the vehicle switch mode controller frequency (i.e., 82 kHz).

Figure 10:
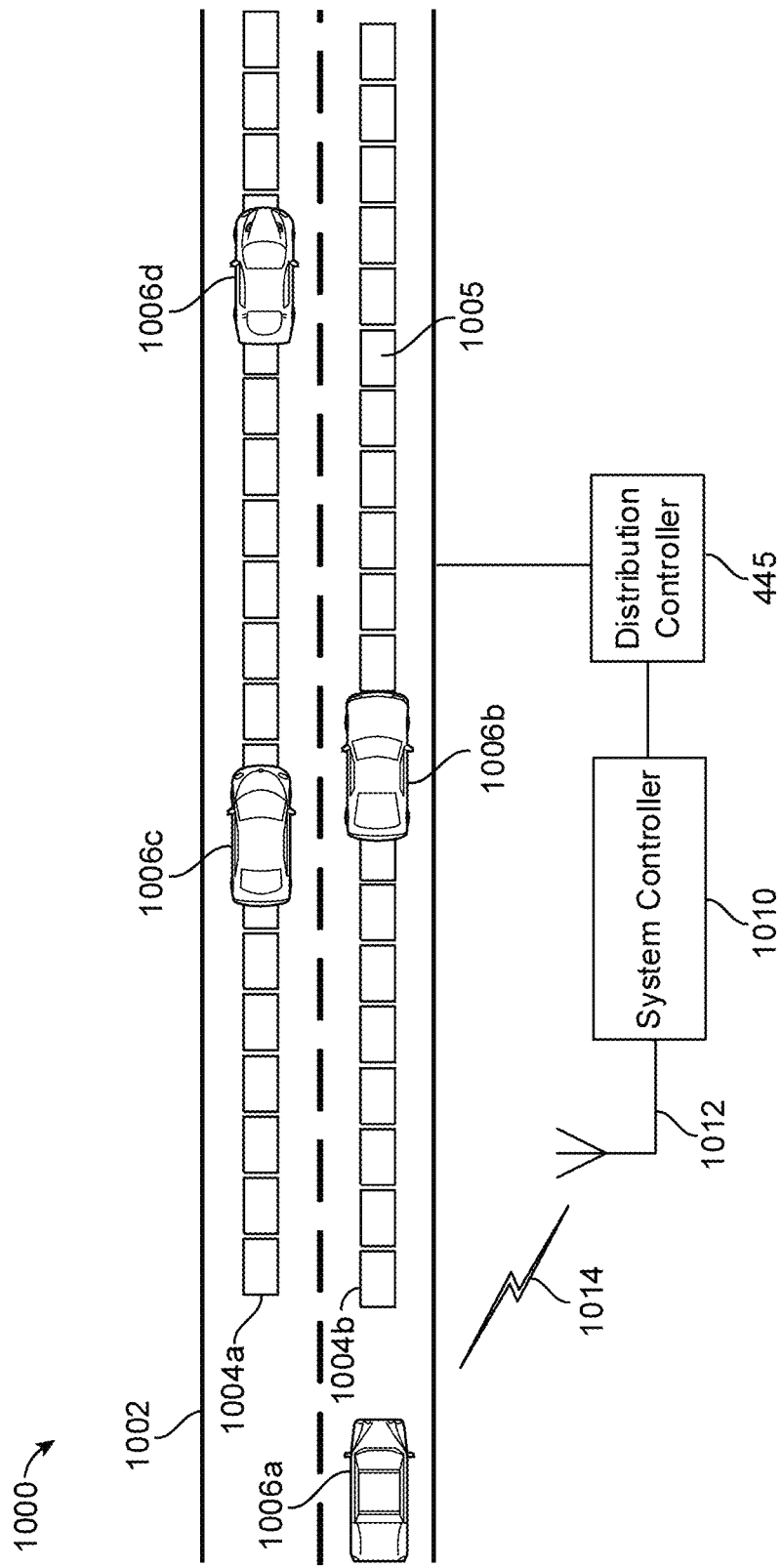
FIG. 10 is a diagram of a dynamic charging system with base side vehicle identification.

Referring to FIG. 10, with further reference to FIGS. 4, 5 and 7, a diagram 1000 of a dynamic charging system with base side vehicle identification is shown. The diagram 1000 includes a section of roadway 1002, a first BAN 1004a, a second BAN 1004b, a first vehicle 1006a, a second vehicle 1006b, a third vehicle 1006c, and a fourth vehicle 1006d travelling on the roadway 1002 and receiving power from a respective BAN. The first BAN 1004a and the second BAN 1004b include several transmitter coil circuits (e.g., base pads), such as an individual base pad 1005, and the vehicles 1006a-d are configured to couple to, and receive power from, the individual pads in the BANs 1004a-b. Each of the vehicles 1006a-d may include a switch mode controller 504 and a communications module 510 as described in FIG. 5. The system 100 also includes a distribution controller 445 and system controller 1010. The system controller 1010 is an example of a controller means and may be a computerized device such as the system controller 720 in FIG. 7. The system controller 1010 may include a wireless transceiver configured to send and receive wireless signals 1014 via a wireless antenna 1012 over a wireless network such as Wi-Fi, CDMA, Wideband CDMA (WCDMA), Long Term Evolution (LTE), BLUETOOTH short-range wireless communication technology, etc. The system controller 1010 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The system controller 1010 is operably coupled to the distribution controller 445 and is configured to send and receive vehicle identification and charging information. For example, the system controller 1010 may send or receive a vehicle switch mode controller frequency to or from the first vehicle 1006a via the wireless signals 1014, and provide the vehicle switch mode controller frequency to the distribution controller 445. The distribution controller 445 may be operably coupled to one or more backbone power supply units 714 and configured to distribute the current to an AC power backbone infrastructure (not shown in FIG. 10). The distribution controller 445 may also be operably coupled to one or more of the base pad driving units 802 and configured to control the power output of the base pad driving unit. The distribution controller 445 may also be operably coupled to the ripple detector 850 in the base pad driving unit and configured to receive vehicle switch mode controller frequency information as a vehicle couples with a respective base pad.

In operation, system controller 1010 may be configured to execute a handshaking process with an approaching vehicle (e.g., such as vehicle 1006a). The handshaking process enables the system controller 1010 and the vehicle 1006a to exchange information via the wireless signals 1014. The communications module 510 in the vehicle 1006a is configured to provide the vehicle switch mode controller frequency of the switch mode controller 504 to the system controller 1010. In an example, the system controller 1010 may provide a desired vehicle switch mode controller frequency to the communications module 510 and the switch mode controller 504 is configured to operate at the desired frequency. Other vehicle and operator information such as a Vehicle Identification Number, registration number, owner name, current charge level, operating status data, etc. . . . may be exchanged between the system controller 1010 and the communications module 510. As vehicles traverse a BAN 1004a-b, the distribution controller 445 is configured to identify the vehicles based on the vehicle switch mode controller frequency as the vehicles couple to a base pad in the BAN 1004a-b. The knowledge of which vehicles are coupled to which base pad may be used by the distribution controller 445 to manage the power supply. For example, each BAN 1004a-b may include several backbone power supply units 714 which are capable of providing a limited amount of power. If the number of vehicles, or the power requirements of the vehicles, on a section of the BAN would exceed power limits of the backbone power supply, the distribution controller 445 may be configured to limit the output of the transmitter coils in the base pads that a vehicle is, or will be, coupled to. The identification of the vehicle based on the switch mode controller frequency enables the distribution controller 445 to pre-arrange a power control solution as the vehicle moves from a first transmitter coil circuit to a second transmitter coil circuit in the BAN (e.g., moving from base pad to base pad). For example, the power settings of the individual base pad 1005 may be configured to a first setting in anticipation of coupling to the second vehicle 1006b, and then configured to a second setting in anticipation of coupling with the first vehicle 1006a when the second vehicle 1006b passes (e.g., decouples).

In an example, an electric vehicle may include two vehicle coils (e.g., couplers) such as a front coil and a rear coil located in the corresponding relative positions from one another on the vehicle. Each of the two vehicle coils may be operably connected to a corresponding switch mode controller (e.g., a front switch mode controller and a rear switch mode controller), operating at different frequencies. In the absence of detecting the switch mode controller frequencies, a base pad may not know whether it is coupling with the front coil or the rear coil. The ripple detector 850, however, enables a base pad to discriminate between the front and rear coils. In an example, the base pad may be configured to detect the arrival of a vehicle when the front switch mode controller frequency is detected, determine the departure of the vehicle at some time after the subsequent detection of the rear switch mode controller frequency.

Figure 11:
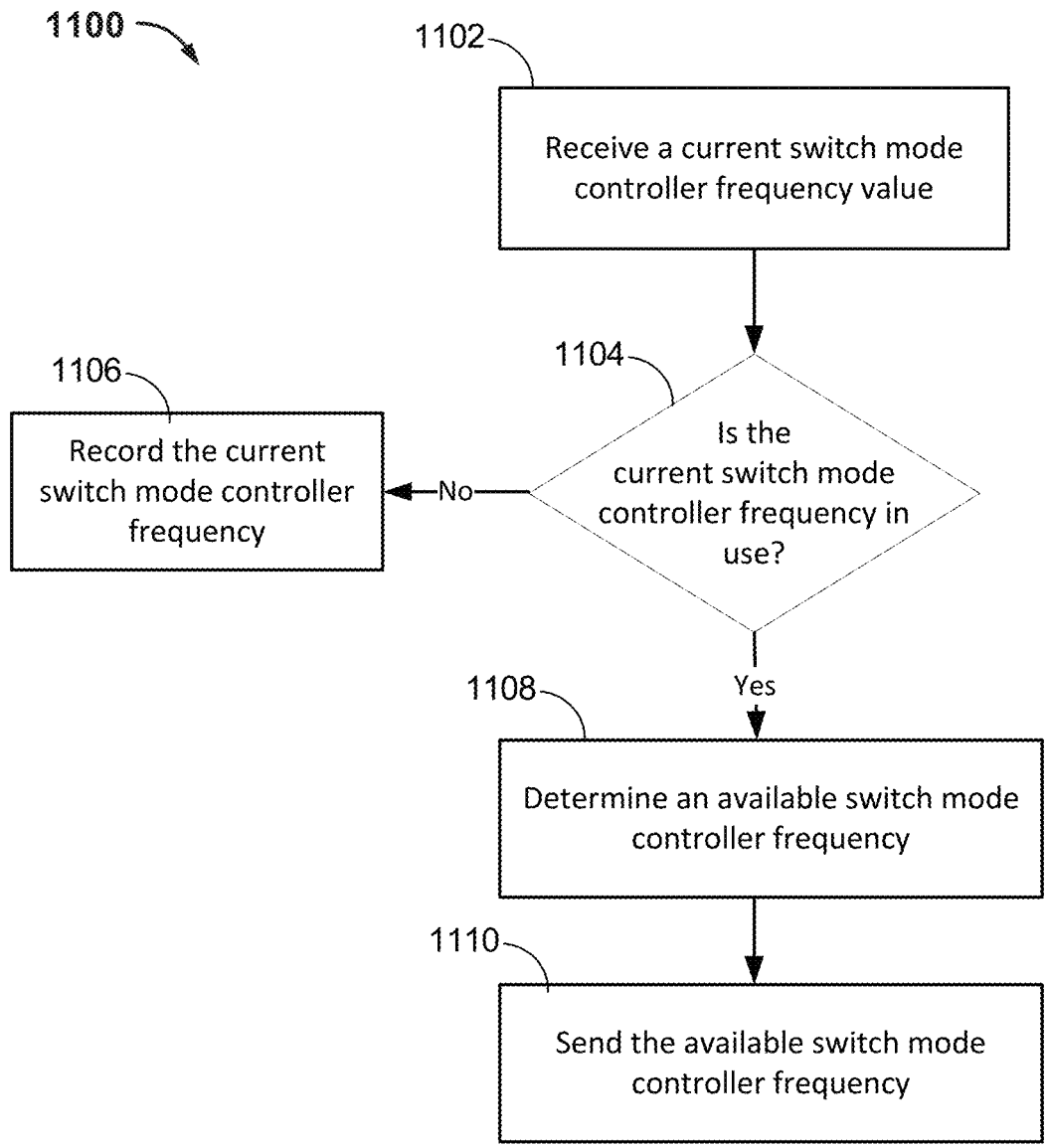
FIG. 11 is a flow diagram of a process for determining a switch mode controller frequency.

Referring to FIG. 11, with further reference to FIGS. 5, 8 and 10, a process 1100 for determining a switch mode controller frequency includes the stages shown. The process 1100, however, is exemplary only and not limiting. The process 1100 may be altered, e.g., by having stages added, removed, or rearranged. While the example process 1100 is described in relation to the dynamic charging system diagram 1000, the process 1100 may also be utilized with static charging areas such as parking structures, public lots, home chargers, etc.

At stage 1102, the system controller 1010 receives a current switch mode controller frequency value. In an example, the communications module 510 in the first vehicle 1006a is configured to establish communications with the system controller 1010. The system controller 1010 may receive vehicle and/or information such as operator name, charge account information, credit card, vehicle identification, registration information, current location, and/or other data that may be useful for a commercial exchange relating to wireless vehicle charging. Other technical information may also be exchanged such as vehicle charge status, coil configuration, battery temperature, and switch mode controller information. The switch mode controller information may be one or more frequency values (e.g., for one or more switch mode controllers in the vehicle). As an example, and not a limitation, the frequency values may be selectable in the range of 70 kHz to 90 kHz and programmable in increments of 0.5 kHz (e.g., 75 kHz, 75.5 kHz, 80 kHz, 80.5 kHz, etc. . . . ). Assuming the switch mode controller in the first vehicle 1006a is operating at a frequency of 75 kHz, the communications module 510 may send the 75 kHz frequency value to the system controller.

At stage 1104, the system controller 1010 determines if the current switch mode controller frequency is in use. The system controller 1010 may access a memory component such as a Random Access Memory (RAM), flash memory, Read Only Memory (ROM), hard disk, or other form of storage medium (e.g., networked data server) to determine which (if any) switch mode controller frequencies are currently in use in a charging system. The memory structure may include a table, or other data structure, including one or more records containing charging information. For example, the data fields in the records may include the switch mode controller frequency, and possibly other related charging variables such as a current time, a current base pad identification, a pad connect time, a pad connect duration, a pad exit time, and possibly a next and a previous pad identification (e.g., based on a direction of travel). The switch mode controller frequency values currently in the memory structure may be considered in use. For example, referring to FIG. 10, the switch mode controller frequencies being used by the second vehicle 1006b, the third vehicle 1006c, and the fourth vehicle 1006d may be stored in the memory structure and considered in use since they are coupled to a base pad in the BAN. The system controller 1010 is configured to query, or otherwise search, the memory structure for the current switch mode controller frequency value to determine if the frequency value is currently in use in the charging system. If the frequency is not in use (i.e., the value is not yet in the memory component), at stage 1106 the system controller 1010 is configured to update the memory structure to include the current switch mode controller frequency value.

At stage 1108, if the current switch mode controller frequency is in use, the system controller 1010 determines an available switch mode controller frequency. An available switch mode controller frequency is a frequency value that is not currently in use by a vehicle in the charging area (e.g., as managed by the system controller 1010). In general, the available switch mode controller frequencies represent a range of frequencies in which a switch mode controller may operate without detrimentally impacting the controller's voltage regulation functions. In an example, the available switch mode controller frequencies are in a range between 70 kHz and 90 kHz. Other values and ranges may be used based on controller configurations, charging frequencies, and industry standards. In an example, one or more subsets of available frequencies may be designated for special vehicle classes, such as emergency vehicles, law enforcement, commercial vehicles, etc. . . . These special vehicles may invoke priority or privileged charging procedures. The resolution between the frequency values may be based on the sensitivity of the ripple detector 850. For example, the ripple detector 850 may be configured to distinguish different frequency values with a 1 kHz resolution. Wider and narrower resolution values may also be used based on the ripple detector 850 or other operational considerations (e.g., 0.1 kHz, 0.5 kHz, 2 kHz, 3 kHz).

In an example, the system controller 1010 may include a list of available switch mode controller frequencies in a memory structure (e.g., a static list), or a program function configured to generate an available switch mode controller frequency (e.g., dynamic generation). The system controller 1010 may determine the available switch mode controller frequency by ensuring the frequency is not in use by another vehicle in the charging area, and then send the available switch mode controller frequency at stage 1110. The communications module 510 in the first vehicle 1006a is configured to receive the available switch mode controller frequency from the system controller 1010, and then reconfigure the switch mode controller 504 to operate at the available switch mode controller frequency.

Figure 12A:
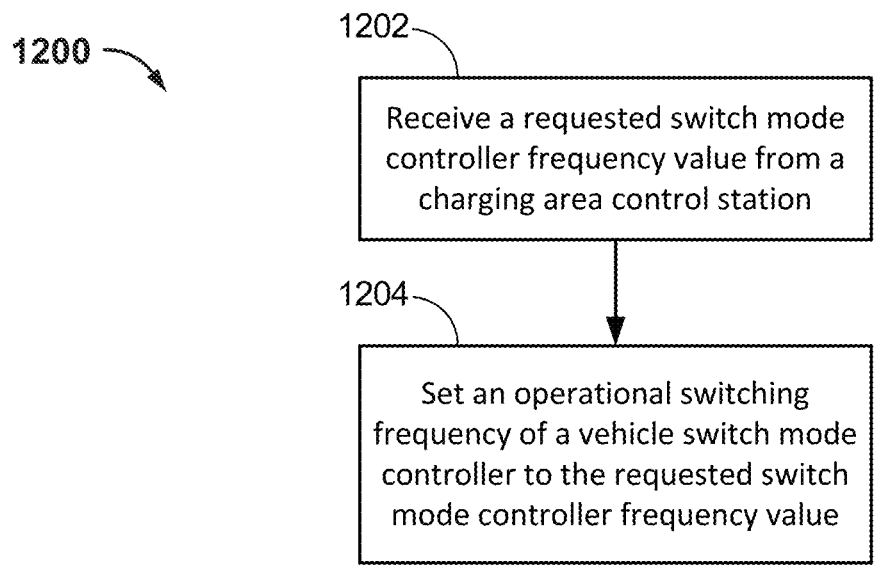
FIG. 12A is flow diagram of a process for setting the operational frequency of a vehicle switch mode controller.

Referring to FIG. 12A, with further reference to FIG. 5, a process 1200 for setting an operational frequency in a vehicle switch mode controller includes the stages shown. The process 1200, however, is exemplary only and not limiting. The process 1200 may be altered, e.g., by having stages added, removed, or rearranged.

At stage 1202, the communications module 510 in the electric vehicle 502 receives a requested switch mode controller frequency value from a charging area control station. For example, the electric vehicle may approach a charging area such as a parking lot, or a BAN, and may establish a communications link with a charging area control station. The control station may send the requested switch mode controller frequency to establish a relative identity of the electric vehicle 502. As used here, a relative identity is a unique value within a limited area and/or a limited time. In a dynamic charging implementation, the relative identity value may be unique amongst the vehicles currently coupled to a base pad in the BAN. The requested switch mode controller frequency value may be stored in the communications module 510, or other vehicle memory location, and provided to the switch mode controller 504.

At stage 1204, the switch mode controller 504 sets its operational switching frequency to the requested switch mode controller frequency. The operational switching frequency of the switch mode controller is configurable within a limited range. That is, the switching frequency may be varied to the extent the power regulation functions of the controller are not impeded. A typical requested switch mode controller frequency value is in around 70 kHz to 90 kHz. As described in FIG. 8 the switch mode controller frequency value may create a ripple in the base pad driving unit, which may be detected by the ripple detector 850. The frequency of the ripple may be provided to a distribution network and used to determine the operational switching frequency of the vehicle's switch mode controller. In an example, this frequency may be used as a relative identity as the vehicle traverses the base pads in a BAN.

Figure 12B:
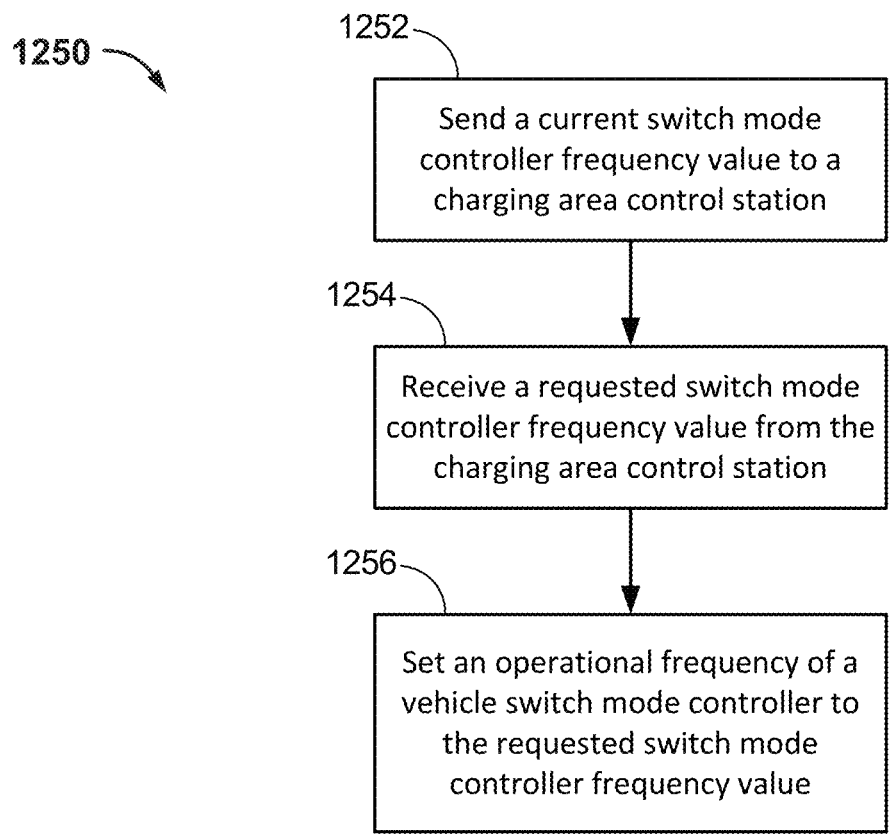
FIG. 12B is flow diagram of a process for changing the operational frequency of a vehicle switch mode controller based on a value received from a control station.

Referring to FIG. 12B, with further reference to FIGS. 5, 10 and 11, a process 1250 for changing the operational frequency of a vehicle switch mode controller based on a value received from a control station includes the stages shown. The process 1250, however, is exemplary only and not limiting. The process 1250 may be altered, e.g., by having stages added, removed, or rearranged.

At stage 1252, the communications module 510 in the electric vehicle 502 sends a current switch mode controller frequency value to a charging area control station. For example, the electric vehicle 502 may be the first vehicle 1006*a* and the charging area control station may be the system controller 1010 depicted in FIG. 10. The first vehicle 1006*a* and the system controller 1010 may communicate with one another as the first vehicle approaches the BAN 1004*b*. The first vehicle 1006*a* may send the current frequency of the switch mode controller to the system controller 1010 for validation in view of the other frequencies in use in the charging area (e.g., the second vehicle 1006*b*, the third vehicle 1006*c*, and the fourth vehicle 1006*d*). The system controller 1010 is configured to determine if the current switch mode controller frequency is in use as described in FIG. 11.

At stage 1254, the communications module 510 in the first vehicle 1006*a* receives a requested switch mode controller frequency value from a charging area control station. The system controller 1010 determines if the current switch mode controller frequency is in use in the charging area. If the current frequency is in use, then the system controller 1010 determines an available frequency and sends it to the vehicle 1006*a* as the requested switch mode controller frequency. The requested switch mode controller frequency value may be stored in the communications module 510, or other vehicle memory location, and provided to the switch mode controller 504.

At stage 1256, the switch mode controller 504 sets its operational switching frequency to the requested switch mode controller frequency. The operational switching frequency of the switch mode controller is configurable within a limited range. That is, the switching frequency may be varied to the extent the power regulation functions of the controller are not impeded. A typical requested switch mode controller frequency value is in around 70 kHz to 90 kHz. As described in FIG. 8 the switch mode controller frequency value may create a ripple in the base pad driving unit, which may be detected by the ripple detector 850. The frequency of the ripple may be provided to the distribution controller 445 and used as a relative identity as the vehicle traverses the base pads in the first BAN 1004*a* and/or the second BAN 1004*b*.

Figure 13:
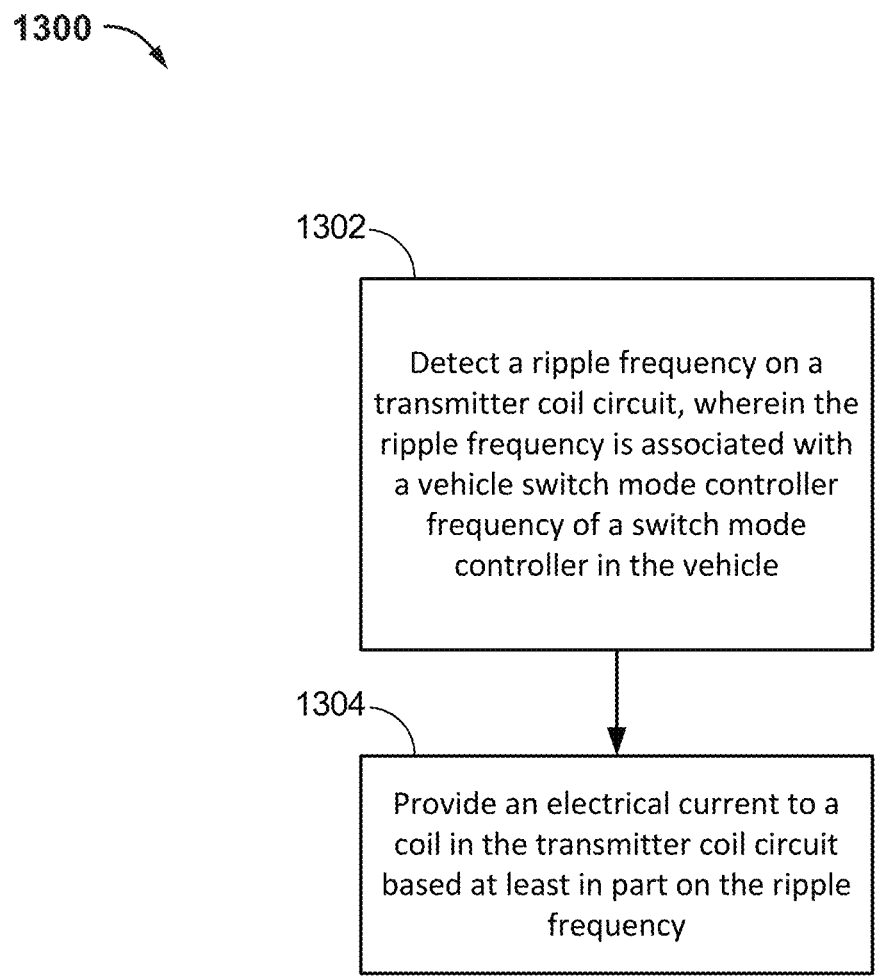
FIG. 13 is a flow diagram of a process providing current to a transmitter coil.

Referring to FIG. 13, with further reference to FIGS. 4, 7 and 8, a process 1300 for providing current to a transmitter coil includes the stages shown. The transmitter coil may be part of a charging base pad. The process 1300, however, is exemplary only and not limiting. The process 1300 may be altered, e.g., by having stages added, removed, or rearranged. The process 1300 may be used with the dynamic charging system diagram 1000, and/or with static charging areas.

At stage 1302, a ripple detector 850 operably coupled to a base pad driving unit 802 detects a ripple frequency on a transmitter coil circuit, wherein the ripple frequency is associated with a vehicle switch mode controller frequency. In an example, the base pad driving unit 802 and the base pad coil 806 are the transmitter coil circuit, and the ripple detector 850 may utilize a current transformer 820 to detect the ripple current. The ripple current may be processed as described in FIG. 8, and a ripple frequency and base pad identification information may be provided to the distribution controller 445. The ripple current may be used to determine the vehicle switch mode controller frequency. In an example, the vehicle switch mode controller frequency may be used to identify the vehicle. That is, the distribution controller 445 may use the vehicle switch mode controller frequency to establish a relative identity of the vehicle in a charging area as previously described.

Figure 14:
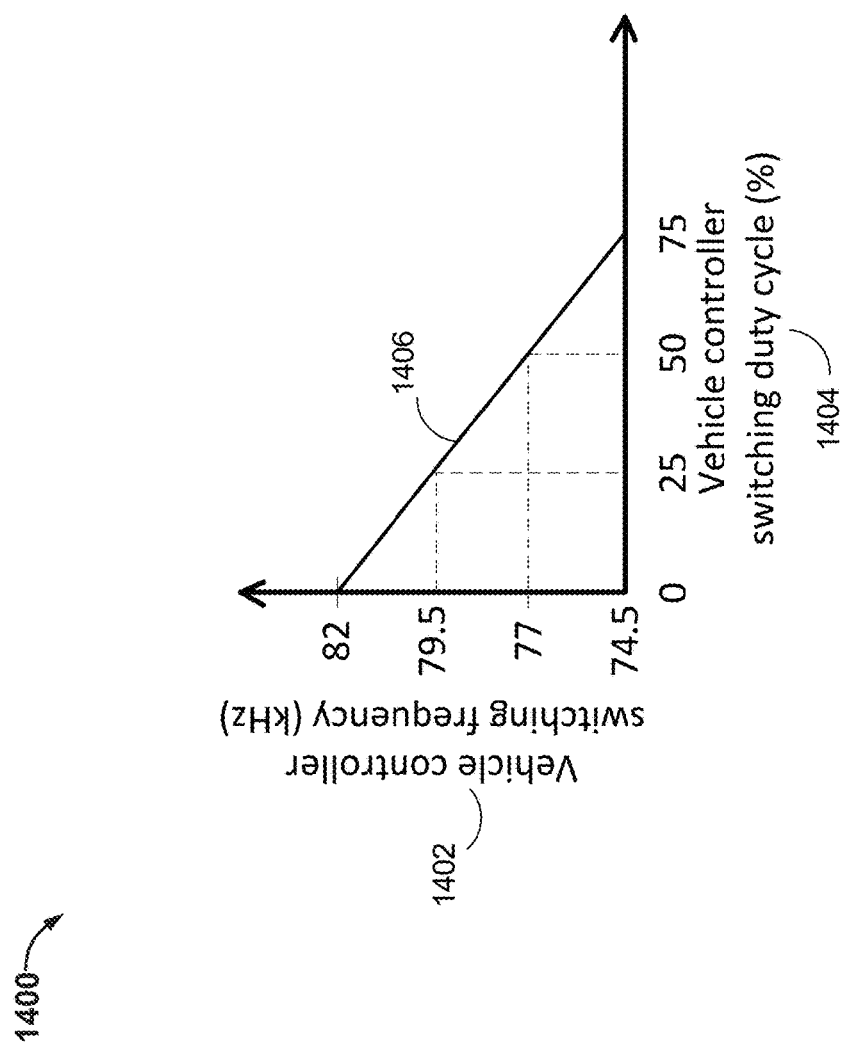
FIG. 14 is a graphical representation of a function for determining a vehicle controller switching duty cycle based on the vehicle controller switching frequency.

In another example, the vehicle switch mode controller frequency may be used to determine a vehicle controller switching duty cycle. Referring to FIG. 14, a graphical representation of a function 1400 for determining a vehicle controller switching duty cycle based on the vehicle controller switching frequency is shown. The function 1400 includes an input variable 1402 indicating the vehicle controller switching frequency, a function line 1406 indicating the relationship between the input variable and an output variable 1404 representing the vehicle controller switching duty cycle. FIG. 14 indicates a function line 1406 to relate the input variable 1402 and the output variable 1404. The function line 1406 need not be a straight line and may be a curve to indicate unique pairs of input and outputs. In operation, the switch mode controller 817 is configured to adjust the switching frequency based on the current duty cycle. That is, the switching frequency may be used to represent the current duty cycle and thus by detecting the ripple caused by the switching frequency, a charging base pad may also know the current duty cycle of a switching power supply. For example, as indicated in FIG. 14, if the controller's duty cycle is 50%, then the switching frequency is adjusted to 77 kHz. Similarly, if the controller's duty cycle is 25%, then the switching frequency is adjusted to 79.5 kHz, and so on. The distribution controller 445 may utilize the function 1400 to determine the vehicle controller switching duty cycle based on the switching frequency.

At stage 1304, the base pad driving unit 802 provides an electrical current to a coil in the transmitter coil circuit based at least in part on the ripple frequency. The base pad coil 806 is an example of a coil in the transmitter coil circuit. The base pad driving unit 802 is operably connected to the distribution controller 445 (e.g., directly, via one or more local controllers 425, or via other network resources) and provides a regulated amount of electrical current to the base pad coil 806. In an example, the distribution controller 445 may also command the power supply/inverter 435 to generate a current and distribute the current to the AC power backbone 430. In an example, the vehicle controller switching frequency determined from the ripple frequency is used for vehicle identification. The distribution controller 445 may command the base pad driving unit 802 to provide electrical current based on power requirements associated with an individual vehicle (e.g., consistent power from each base pad as the vehicle traverses the BAN). The distribution controller 445 may distribute current to the AC power backbone 430 based on the number of identified vehicle on a backbone loop, or on a future backbone loop, to prevent overloading. In an example, the distribution controller 445 may utilize the vehicle identification information to pre-arrange the coil current based on expected vehicle traffic (e.g., as determined by the vehicle identifications).

In another example, the distribution controller 445 may utilize the controller switching frequency derived from the ripple frequency to determine the switching duty cycle for the vehicle on the base pad coil 806. The distribution controller 445 may then distribute current in to the AC power backbone 430 to lower the duty cycle of the vehicle side switch mode controller 817 close to zero. As the AC power is adjusted, the frequency of the switch mode controller 817 may be adjusted as depicted in FIG. 14 to indicate the duty cycle. In this example, the frequency of the switch mode controller 817 provides feedback to the distribution controller 445 regarding the duty cycle of the switch mode controller. The distribution controller 445 may continually monitor the ripple frequency (e.g., switch mode controller frequency) and adjust the AC power backbone 430 as desired in an effort to reduce the switch mode controller duty cycle.

Figure 15:
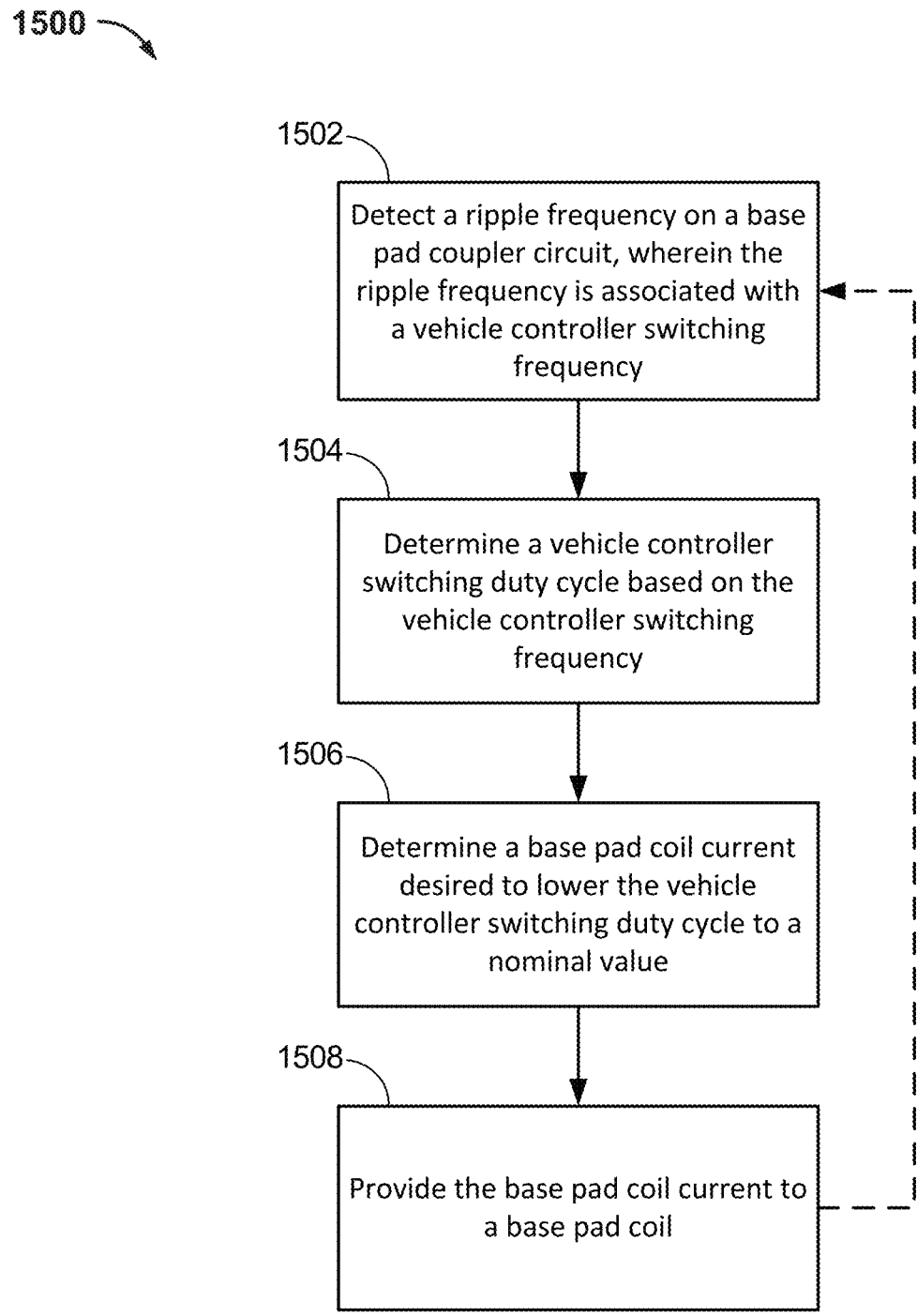
FIG. 15 is a flow diagram of a process for providing current to a base pad coil based on the vehicle controller switching duty cycle.

Referring to FIG. 15, with further reference to FIGS. 4 and 8, a process 1500 for providing current to a base pad coil based on the vehicle controller switching duty cycle includes the stages shown. The process 1500, however, is exemplary only and not limiting. The process 1500 may be altered, e.g., by having stages added, removed, or rearranged. The process 1500 may operate as a single event, or may iteratively loop from stage 1502 to stage 1508 and back to stage 1502. This looping capability is optional and depicted in FIG. 15 as a dotted line.

At stage 1502, a ripple detector 850 operably coupled to a base pad driving unit 802 detects a ripple frequency on a base pad coil circuit, wherein the ripple frequency is associated with a vehicle switch mode controller frequency. In an example, base pad driving unit 802 may include the base pad coil circuit, and the ripple detector 850 may utilize a current transformer 820 to detect the ripple current. The ripple current may be processed as described in FIG. 8. The ripple frequency and base pad identification information may be provided to the distribution controller 445.

At stage 1504, the distribution controller 445 determines a vehicle controller switching duty cycle based on the vehicle controller switching frequency. The distribution controller 445 is an example of a means for determining the vehicle switch mode controller frequency. The distribution controller 445 may utilize the ripple frequency determined at stage 1502 to determine the vehicle controller switching frequency and utilize a function such as described in FIG. 14 to determine the vehicle controller duty cycle. In an example, the function may be a data table with the corresponding input variable 1402 values (e.g., the vehicle controller switching frequency) and output variable 1404 values (e.g., vehicle controller switching duty cycle). For example, if the vehicle controller switching frequency is 79.5 kHz, then the vehicle controller switching duty cycle (%) is 25%.

At stage 1506, the distribution controller 445 determines a base pad coil current desired to lower the vehicle controller switching duty cycle to a nominal value. Generally, the vehicle controller duty cycle represents the component stress on the vehicle side controller which includes the vehicle coil, resonant capacitor, filter components, rectifier diode and semi-conductor switches. The vehicle controller duty cycle is proportional to base coil current '$I_1$' and the mutual coupling 'M' (see FIG. 5) between the base coil and the vehicle coil. Thus:

$$\text{DutyCycle} \propto I_1 \cdot M$$

In an example, the vehicle controller duty cycle may be inversely proportional depending on the type of controller (e.g., boost or buck converter). Utilizing the known the duty cycle and assuming that the mutual coupling is constant, the desired base coil current $I_1$ for the vehicle controller to operate in the preferable condition may be estimated. In a BAN application (e.g., along a distance on a roadway), both the vehicle duty cycle and the mutual coupling values may be determined based on a distance or time average perspective.

At stage 1508, the base pad driving unit 802 provides the base pad coil current to a base pad coil 806. The base pad driving unit 802 is operably connected to the distribution controller 445 (e.g., directly, via one or more local controllers 425, or via other network resources) and is configured to provide the base pad coil current to the base pad coil 806. In an example, the distribution controller 445 may also command the power supply/inverter 435 to generate a current and distribute the desired current to the AC power backbone 430. The distribution controller 445 may then distribute current in to the AC power backbone 430 to lower the controller duty cycle close to nominal value (e.g., less than 2% the maximum charging current). In an example, process 1500 is performed iteratively and may loop back to stage 1502. As the AC power is adjusted, the frequency of the switch mode controller 817 may be adjusted as depicted in FIG. 14 to indicate the duty cycle. The distribution controller 445 may periodically monitor the ripple frequency (e.g., switch mode controller frequency) and adjust the AC power backbone 430 as desired in an effort to lower the vehicle controller switching duty cycle to a nominal value.

Figure 16:
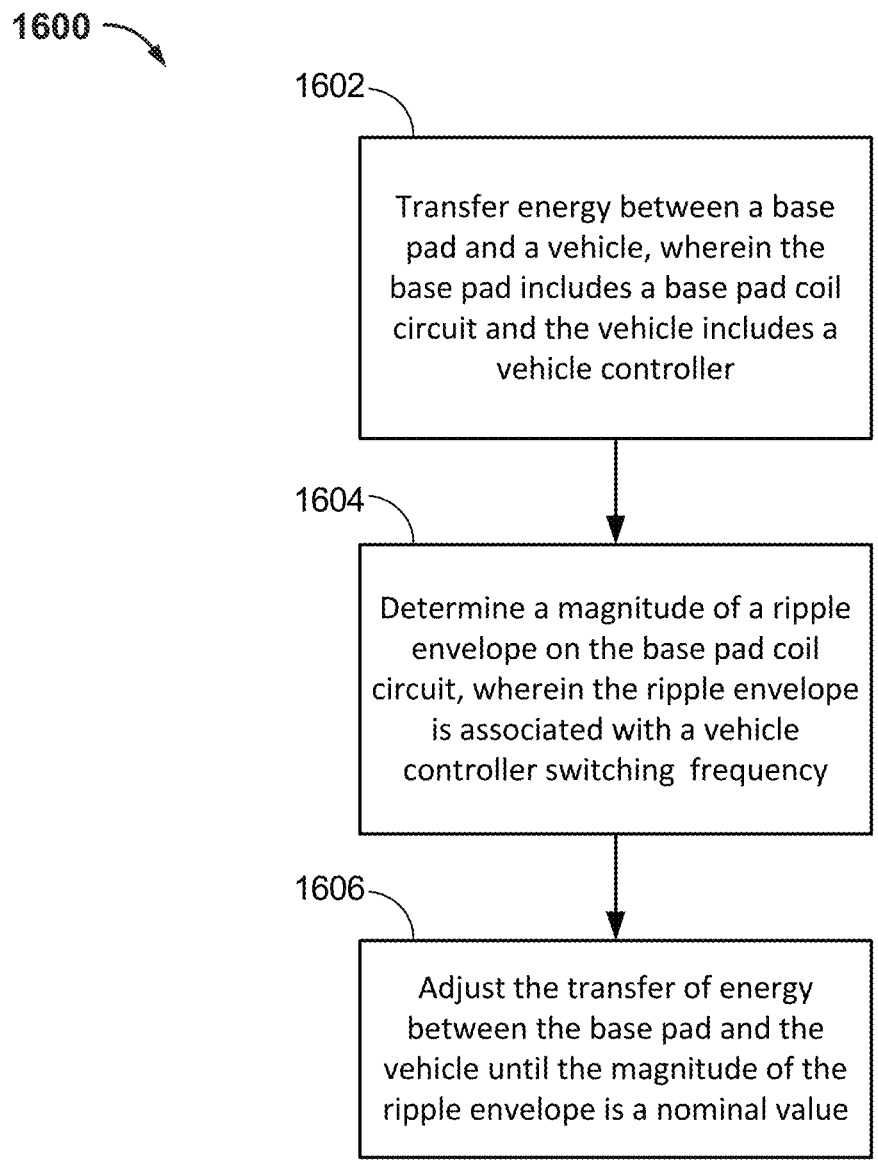
FIG. 16 is a flow diagram of a process for transferring energy between a base pad and a vehicle

Referring to FIG. 16, with further reference to FIGS. 4, 5 and 8, a process 1600 for transferring energy between a base pad and a vehicle includes the stages shown. The process 1600, however, is exemplary only and not limiting. The process 1600 may be altered, e.g., by having stages added, removed, or rearranged. The process 1600 may be used with static and dynamic charging systems.

At stage 1602, a wireless power transfer system transfers energy between a base pad and a vehicle, wherein the base pad includes a base pad coil circuit and the vehicle includes a vehicle controller. The base pad driving unit 802 includes an example of a base pad coil circuit and the switch mode controller 817 is a component of the vehicle controller. The base pad driving unit 802 is configured to provide current to the base pad coil 806 to generate a magnetic flux and induce a current in the vehicle coil 807. The switch mode controller 817 is configured to perform voltage regulation during charging by activating the switch 814 at a vehicle controller switching frequency value of between 70 kHz and 90 kHz. Other frequencies may be used based on the design of the switch mode controller 817 and/or charging and system requirements.

At stage 1604, the ripple detector 850 determines a magnitude of a ripple envelope on the base pad coil circuit, wherein the ripple envelope is associated with a vehicle controller switching frequency. During the transfer of energy from the base pad to the vehicle, the switch mode controller 817 may create a ripple envelope (e.g., the beat frequency) on the vehicle pad resonant voltage when the duty cycle is greater than zero. The ripple envelope is created while the switch mode controller 817 is still performing voltage regulation. The resonant voltage ripple envelope will cause the resonant current/voltage in the base pad coil circuit to have a similar envelope at the same ripple frequency. The ripple detector 850 may be configured to determine the magnitude of the ripple voltage. For example, the output of the high pass filter stage 828 may be a means to determine the magnitude of the ripple envelope.

At stage 1606, the base pad driving unit 802 adjusts the transfer of energy between the base pad and the vehicle until the magnitude of the ripple envelope is a nominal value. The base pad driving unit 802 may be operably coupled to the ripple detector 850 and configured to receive the magnitude of the ripple envelope. In an example, the magnitude of the ripple frequency is provided to the distribution controller 445, and the base pad driving unit 802 is configured to receive control commands from the distribution controller 445. As the current in the base pad coil 806 is reduced, the duty cycle of the switch mode controller 817 may also reduce. As the duty cycle approaches zero, the magnitude of the ripple envelope decreases. When the duty cycle is zero, the ripple envelope magnitude will be zero. Noise and nonlinearities in the switch mode controller 817 and the base pad driving unit may impact the ripple signal and a nominal ripple envelope magnitude may indicate that the duty cycle is at a minimum. For example, a nominal value of the ripple envelope may be a value below 1.5 mV.

Figure 17:
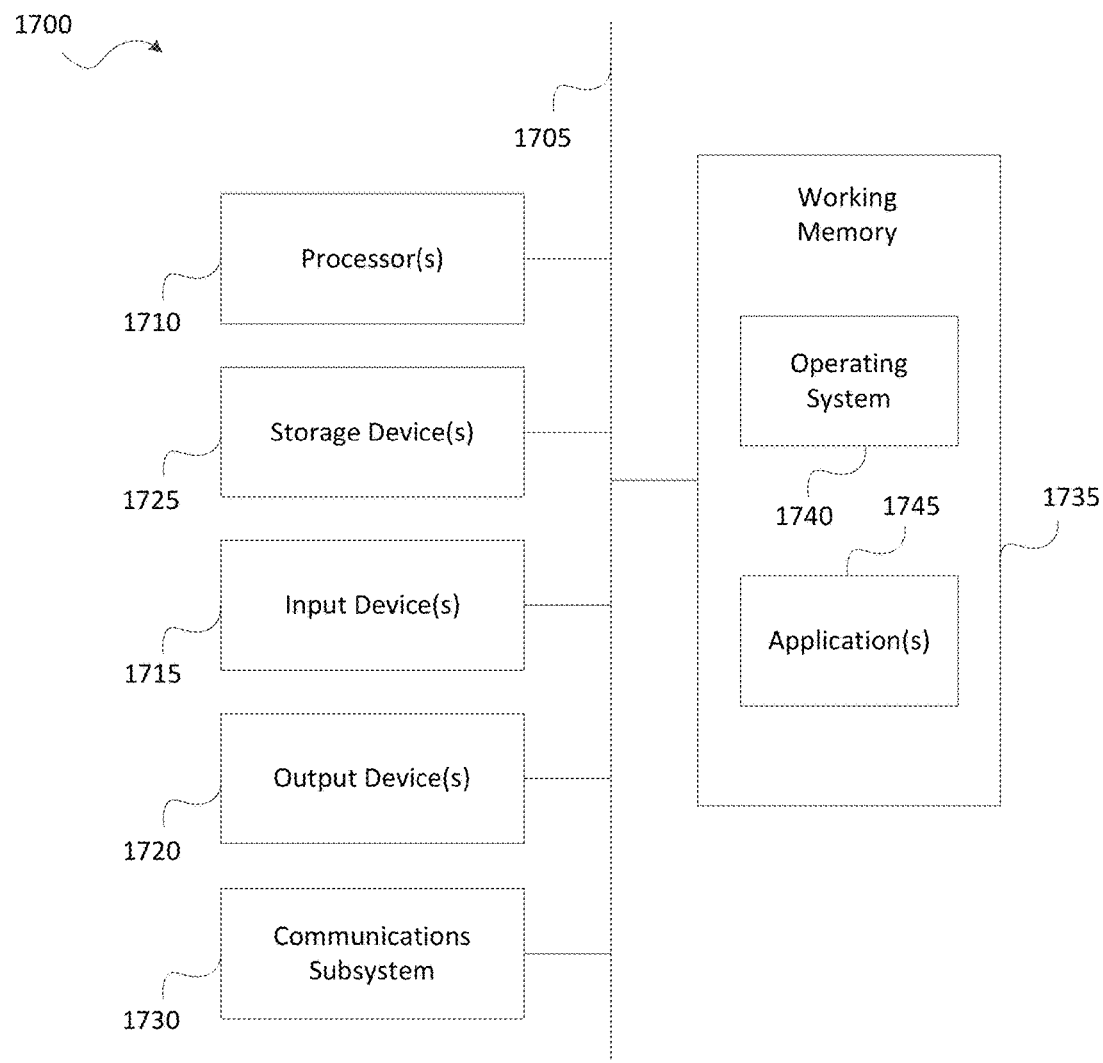
FIG. 17 illustrates a block diagram of an example of a computer system

A computer system as illustrated in FIG. 17 may incorporate as part of the previously described computerized devices. FIG. 17 provides a schematic illustration of one embodiment of a computer system 1700 that can perform the methods provided by various other embodiments, as described herein, and/or can function a Vehicle Control Unit (VCU), including a switch mode controller 504 and a communications module 510, a local controller 425, a distribution controller, and a system controller 1010. It should be noted that FIG. 17 is meant only to provide a generalized illustration of various components, any or all of which may be utilized as appropriate. FIG. 17, therefore, broadly illustrates how individual system elements may be implemented in a relatively separated or relatively more integrated manner.

The computer system 1700 is shown comprising hardware elements that can be electrically coupled via a bus 1705 (or may otherwise be in communication, as appropriate). The hardware elements may include one or more processors 1710, including without limitation one or more general-purpose processors and/or one or more special-purpose processors (such as digital signal processing chips, graphics acceleration processors, and/or the like); one or more input devices 1715, which can include without limitation a mouse, a keyboard and/or the like; and one or more output devices 1720, which can include without limitation a display device, a printer and/or the like.

The computer system 1700 may further include (and/or be in communication with) one or more non-transitory storage devices 1725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1700 might also include a communications subsystem 1730, which can include without limitation a modem, a network card (wireless or wired), an infrared communication device, a wireless communication device and/or chipset (such as a Bluetooth device, an 802.11 device, a WiFi device, a WiMax device, cellular communication facilities, etc.), and/or the like. The communications subsystem 1730 may permit data to be exchanged with a network (such as the network described below, to name one example), other computer systems, and/or any other devices described herein. In many embodiments, the computer system 1700 will further comprise a working memory 1735, which can include a RAM or ROM device, as described above.

The computer system 1700 also can comprise software elements, shown as being currently located within the working memory 1735, including an operating system 1740, device drivers, executable libraries, and/or other code, such as one or more application programs 1745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1725 described above. In some cases, the storage medium might be incorporated within a computer system, such as the system 1700. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1700 and/or might take the form of source and/or installable code, which, upon compilation and/or installation on the computer system 1700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1700) to perform methods in accordance with various embodiments of the invention. According to a set of embodiments, some or all of the procedures of such methods are performed by the computer system 1700 in response to processor 1710 executing one or more sequences of one or more instructions (which might be incorporated into the operating system 1740 and/or other code, such as an application program 1745) contained in the working memory 1735. Such instructions may be read into the working memory 1735 from another computer-readable medium, such as one or more of the storage device(s) 1725. Merely by way of example, execution of the sequences of instructions contained in the working memory 1735 might cause the processor(s) 1710 to perform one or more procedures of the methods described herein.

The terms "machine-readable medium," "computer-readable medium," and "non-transitory processor-readable storage medium" as used herein, refer to any medium that participates in providing data that causes a machine to operate in a specific fashion. In an embodiment implemented using the computer system 1700, various computer-readable media (e.g., processor-readable instructions) might be involved in providing instructions/code to processor(s) 1710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1725. Volatile media include, without limitation, dynamic memory, such as the working memory 1735. Transmission media include, without limitation, coaxial cables, copper wire and fiber optics, including the wires that comprise the bus 1705, as well as the various components of the communication subsystem 1730 (and/or the media by which the communications subsystem 1730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1700. These signals, which might be in the form of electromagnetic signals, acoustic signals, optical signals and/or the like, are all examples of carrier waves on which instructions can be encoded, in accordance with various embodiments of the invention.

The communications subsystem 1730 (and/or components thereof) generally will receive the signals, and the bus 1705 then might carry the signals (and/or the data, instructions, etc. carried by the signals) to the working memory 1735, from which the processor(s) 1705 retrieves and executes the instructions. The instructions received by the working memory 1735 may optionally be stored on a storage device 1725 either before or after execution by the processor(s) 1710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for wirelessly transferring energy to a vehicle, comprising:
    detecting a ripple frequency on a transmitter coil circuit, wherein the ripple frequency is associated with a vehicle switch mode controller frequency of a switch mode controller in the vehicle; and
    providing an electrical current to a coil in the transmitter coil circuit based at least in part on the ripple frequency.

2. The method of claim 1 wherein the coil in the transmitter coil circuit is configured to generate a magnetic field to transfer energy to the vehicle via induction.

3. The method of claim 1 wherein wirelessly transferring power to the vehicle is performed at a system charging frequency and the ripple frequency corresponding to a beat frequency between the vehicle switch mode controller frequency and the system charging frequency.

4. The method of claim 3 further comprising determining the vehicle switch mode controller frequency based on the ripple frequency and the system charging frequency.

5. The method of claim 4 further comprising determining a vehicle identification based on the vehicle switch mode controller frequency.

6. The method of claim 4 further comprising:
    providing the ripple frequency to a distribution controller; and
    receiving a command from the distribution controller, wherein providing the electrical current to the coil in the transmitter coil circuit is based on the command.

7. The method of claim 4 further comprising providing the vehicle switch mode controller frequency to a second transmitter coil circuit, wherein the second transmitter coil circuit is configured to provided current to a second coil based on the vehicle switch mode controller frequency.

8. The method of claim 1 further comprising determining a vehicle controller switching duty cycle based on the ripple frequency.

9. The method of claim 1 further wherein the ripple frequency is associated with a ripple envelope and providing the electrical current to the coil in the transmitter coil circuit is based on a magnitude of the ripple envelope.

10. An apparatus for wirelessly transferring energy to a vehicle, comprising:
a transmitter coil circuit including a coil;
a ripple detector operably coupled to the transmitter coil circuit;
at least one processor operably coupled to the transmitter coil circuit and the ripple detector and configured to:
receive a ripple frequency from the ripple detector, wherein the ripple frequency is associated with a vehicle switch mode controller frequency of a switch mode controller in the vehicle; and
provide an electrical current to the transmitter coil circuit based at least in part on the ripple frequency.

11. The apparatus of claim 10 wherein the coil is configured to generate a magnetic field to transfer energy to the vehicle via induction.

12. The apparatus of claim 10 wherein the ripple detector includes a peak detector stage comprising at least a series connection of a diode and a capacitor.

13. The apparatus of claim 10 wherein the ripple detector includes a sample and hold stage comprising at least a capacitor, a field effect transistor (FET), and an operational amplifier.

14. The apparatus of claim 10 wherein the ripple detector includes a zero crossing detector stage comprising at least an operational amplifier comparator circuit.

15. The apparatus of claim 10 wherein the transmitter coil circuit is configured to operate at a system charging frequency and the ripple frequency is equal to a beat frequency between the vehicle switch mode controller frequency and the system charging frequency.

16. The apparatus of claim 15 wherein the at least one processor is configured to determine the vehicle switch mode controller frequency based on the ripple frequency and the system charging frequency.

17. The apparatus of claim 16 wherein the at least one processor is configured to determine a vehicle identification based on the vehicle switch mode controller frequency.

18. The apparatus of claim 17 wherein the at least one processor is configured to:
provide the ripple frequency to a distribution controller;
receive a command from the distribution controller; and
provide the electrical current to the transmitter coil circuit based at least in part on the command.

19. The apparatus of claim 10 wherein the at least one processor is configured to determine a vehicle controller switching duty cycle based on the ripple frequency.

20. An apparatus for wirelessly transferring energy to a vehicle, comprising:
means for detecting a ripple frequency on a transmitter means, wherein the ripple frequency is associated with a vehicle switch mode controller frequency of a switch mode controller in the vehicle; and
means for providing an electrical current to the transmitter means based at least in part on the ripple frequency.

21. The apparatus of claim 20 wherein the transmitter means is configured to generate a magnetic field to transfer energy to the vehicle via induction.

22. The apparatus of claim 20 wherein wirelessly transferring power to the vehicle is performed at a system charging frequency and the ripple frequency corresponding to a beat frequency between the vehicle switch mode controller frequency and the system charging frequency.

23. The apparatus of claim 22 further comprising a means for determining the vehicle switch mode controller frequency based on the ripple frequency and the system charging frequency.

24. The apparatus of claim 23 further comprising controller means configured to determine a vehicle identification based on the vehicle switch mode controller frequency.

25. The apparatus of claim 23 further comprising controller means configured to determine a vehicle controller switching duty cycle based on the ripple frequency.

26. A non-transitory processor-readable storage medium comprising processor-readable instructions configured to cause one or more processors to control a wireless charging system, comprising:
code for detecting a ripple frequency on a transmitter coil circuit, wherein the ripple frequency is associated with a vehicle switch mode controller frequency of a switch mode controller in a vehicle; and
code for providing an electrical current to a coil in the transmitter coil circuit based at least in part on the ripple frequency.

27. The storage medium of claim 26 wherein the code for providing the electrical current to the coil includes a system charging frequency and the code for determining the ripple frequency includes determining a beat frequency between the vehicle switch mode controller frequency and the system charging frequency.

28. The storage medium of claim 27 further comprising code for determining the vehicle switch mode controller frequency based on the ripple frequency and the system charging frequency.

29. The storage medium of claim 28 further comprising code for determining a vehicle identification based on the vehicle switch mode controller frequency.

30. The storage medium of claim 28 further comprising:
code for providing the ripple frequency to a distribution controller; and
code for receiving a command from the distribution controller, wherein the code for providing the electrical current to the coil in the transmitter coil circuit is based at least in part on the command.

* * * * *